US012345871B2

(12) United States Patent
Fuke et al.

(10) Patent No.: US 12,345,871 B2
(45) Date of Patent: Jul. 1, 2025

(54) INSPECTION CABLE GUIDE MECHANISM, DRIVING DEVICE, INSPECTION CABLE INSERTION JIG, AND GAS TURBINE INSPECTION SYSTEM INCLUDING THESE

(71) Applicants: MITSUBISHI HEAVY INDUSTRIES, LTD., Tokyo (JP); TOKYO INSTITUTE OF TECHNOLOGY, Tokyo (JP)

(72) Inventors: Yasutaka Fuke, Tokyo (JP); Hirone Komatsu, Tokyo (JP); Takashi Matsuzawa, Tokyo (JP); Shin Asano, Tokyo (JP); Kotaro Tadano, Tokyo (JP); Koshiro Irie, Tokyo (JP); Yoichi Sato, Tokyo (JP)

(73) Assignees: MITSUBISHI HEAVY INDUSTRIES, LTD., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 360 days.

(21) Appl. No.: 18/103,181

(22) Filed: Jan. 30, 2023

(65) Prior Publication Data
US 2023/0280582 A1 Sep. 7, 2023

(30) Foreign Application Priority Data

Feb. 2, 2022 (JP) ................. 2022-014939

(51) Int. Cl.
*G02B 23/24* (2006.01)
*F01D 21/00* (2006.01)
(Continued)

(52) U.S. Cl.
CPC ....... *G02B 23/2492* (2013.01); *F01D 21/003* (2013.01); *G01M 15/14* (2013.01);
(Continued)

(58) Field of Classification Search
CPC ............... G01M 15/14; G02B 23/2492; F01D 21/003; F01D 25/285; G01N 21/954;
(Continued)

(56) References Cited

U.S. PATENT DOCUMENTS 3,788,143 A * 1/1974 Gabriel ................. F01D 17/085
374/E13.006
2010/0234988 A1 9/2010 Buckingham et al.
(Continued)

FOREIGN PATENT DOCUMENTS

EP 3 848 698 A1 7/2021
JP 2017-138584 A 8/2017
(Continued)

OTHER PUBLICATIONS

Matsuzawa et al., "Development of articulated guide mechanism for plant narrow space inspection," SICE SI2020, Dec. 2020, pp. 859-864 (11 pages total), with partial English translation.
(Continued)

*Primary Examiner* — Abdullahi Nur
(74) *Attorney, Agent, or Firm* — Birch, Stewart, Kolasch & Birch, LLP

(57) ABSTRACT

An inspection cable guide mechanism of the present disclosure includes a heat-resistant sheath having flexibility through which a cable is allowed to be inserted and cooling air is allowed to flow toward a tip through a gap between the cable and the heat-resistant sheath, a segment stacked body configured by stacking segments having heat resistance configured to cover the heat-resistant sheath in a centerline direction, and a plurality of wires disposed around the heat-resistant sheath and extending along a centerline, one segment of the segment stacked body is swingable with respect to two segments adjacent to the one segment about swing axes extending in a direction perpendicular to the
(Continued)

centerline, the two swing axes becoming centers when the one segment swings with respect to the two segments are perpendicular to each other when viewed in the centerline direction, and one end of each wire is fixed to one of the segments in the segment stacked body.

12 Claims, 24 Drawing Sheets

(51) Int. Cl.
  *G01M 15/14* (2006.01)
  *G01N 21/954* (2006.01)
(52) U.S. Cl.
  CPC ..... *G01N 21/954* (2013.01); *F05D 2270/804* (2013.01); *G01N 2021/9542* (2013.01)
(58) Field of Classification Search
  CPC ...... G01N 2021/9542; F05D 2270/804; F05D 2240/35; F05D 2270/8041
  See application file for complete search history.

(56) References Cited

U.S. PATENT DOCUMENTS

| | | | |
|---|---|---|---|
| 2013/0192353 A1* | 8/2013 | Hatcher | G02B 23/2484 73/112.01 |
| 2017/0122123 A1* | 5/2017 | Kell | G01M 15/14 |
| 2017/0176737 A1 | 6/2017 | Haffner et al. | |
| 2020/0188042 A1 | 6/2020 | Dong et al. | |

FOREIGN PATENT DOCUMENTS

| | | | |
|---|---|---|---|
| JP | | 6850937 B2 | 3/2021 |
| WO | WO 2020/090959 A1 | | 5/2020 |

OTHER PUBLICATIONS

Wang et al., "Design, Modelling and Validation of a Novel Extra Slender Continuum Robot for In-situ Inspection and Repair in Aeroengine," Robotics and Computer-Integrated manufacturing, vol. 67, 2021, 102054 (11 pages total).

* cited by examiner

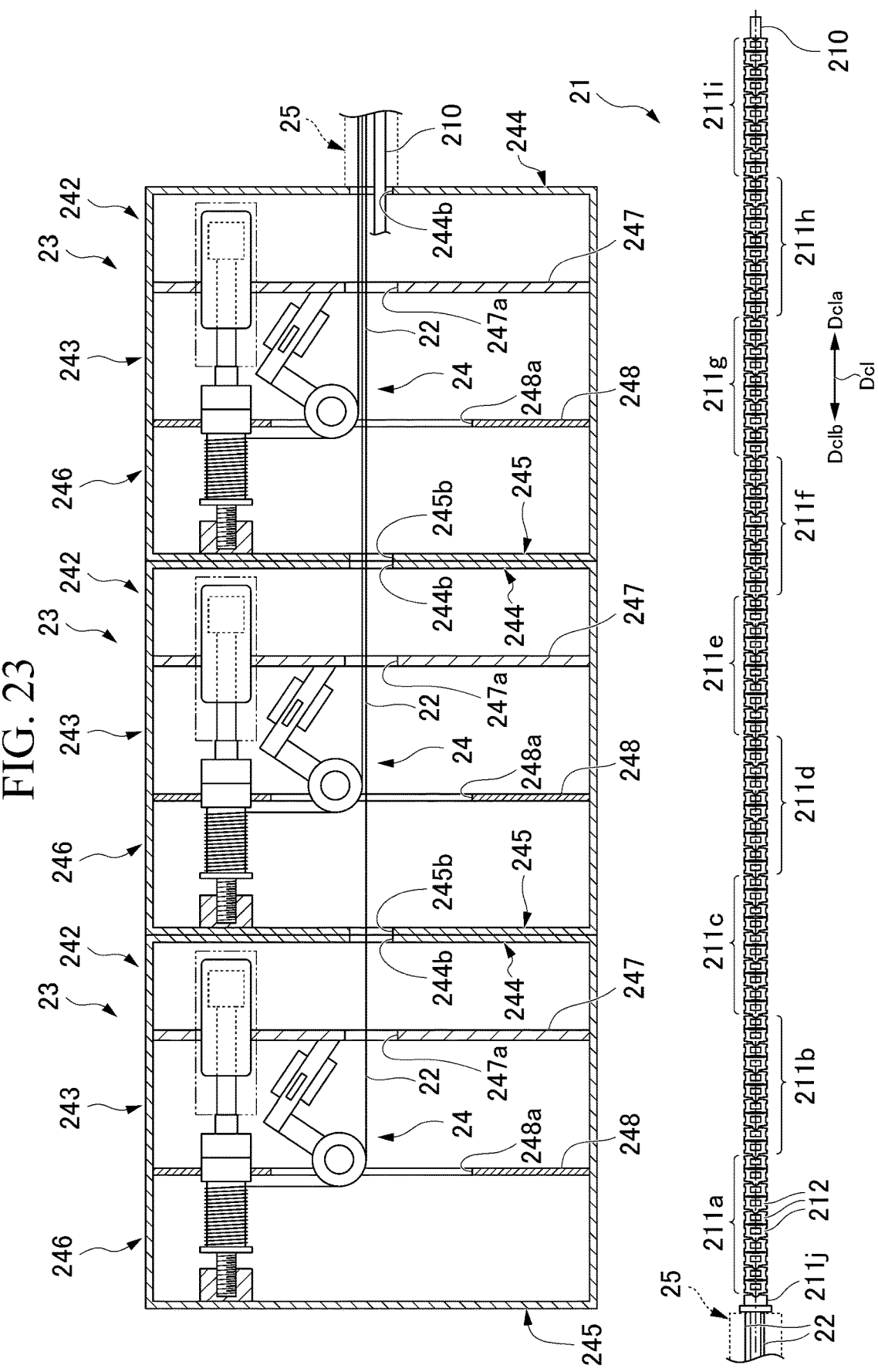

INSPECTION CABLE GUIDE MECHANISM, DRIVING DEVICE, INSPECTION CABLE INSERTION JIG, AND GAS TURBINE INSPECTION SYSTEM INCLUDING THESE

CROSS-REFERENCE TO RELATED APPLICATION

Priority is claimed on Japanese Patent Application No. 2022-014939, filed Feb. 2, 2022, the content of which is incorporated herein by reference.

BACKGROUND OF THE INVENTION

Field of the Invention

The present disclosure relates to an inspection cable guide mechanism, a driving device, an inspection cable insertion jig, and a gas turbine inspection system including these.

Description of Related Art

For example, US Patent Application Publication No. 2020/0188042 discloses a continuum arm robot section in which a plurality of segments through which an inspection cable and a driving cable (wire) are inserted are stacked, and each of the segments is driven by the driving cable. The continuum arm robot section is used as a guide mechanism of an inspection cable configured to inspect the inside of an inspection object such as an aircraft engine or the like.

SUMMARY OF THE INVENTION

Incidentally, when the inspection object is a gas turbine, the inside of the gas turbine has an extremely high temperature even after shutdown. For this reason, it may take time for the internal temperature to drop to a temperature that the guide mechanism can withstand. Accordingly, it is required for the inside of the inspection object to be able to be inspected even under a certain high temperature environment.

In order to solve the above-mentioned problem, the present disclosure is directed to providing an inspection cable guide mechanism, a driving device, an inspection cable insertion jig, and a gas turbine inspection system that are allowed to inspect the inside of an inspection object even under a high temperature environment.

In order to solve the above-mentioned problem, an inspection cable guide mechanism according to the present disclosure includes a heat-resistant sheath having flexibility through which an inspection cable with a tip on which a sensor is provided is allowed to be inserted and cooling air is allowed to flow toward the tip through a gap between the heat-resistant sheath and the inspection cable therein; a segment stacked body configured by stacking three or more segments having heat resistance and covering the heat-resistant sheath from the outside in a direction in which a centerline of the inspection cable extends; and a plurality of wires disposed around the heat-resistant sheath and extending along the centerline, one segment among the segments other than segments of the segments on both ends in the segment stacked body is swingable with respect to two segments adjacent to the one segment in the centerline direction about swing axes extending in a direction perpendicular to the centerline, the two swing axes that become centers when the one segment swings with respect to the two segments are perpendicular to each other when viewed in the centerline direction, and one end of each of the wires is fixed to one of the segments in the segment stacked body.

In addition, a driving device according to the present disclosure is a driving device configured to drive the inspection cable guide mechanism by pulling the wire away from the tip and pushing the wire toward the tip, the driving device including: a wire winding part on which the wire is wound; a rotary actuator having a motor connected to the wire winding part and configured to rotate the wire winding part about an axis line in a winding direction of the wire; a pulley having a pulley main body configured to convert a direction of the wire extending from the wire winding part toward the segment stacked body such that the wire extends along the centerline midway, and a support part configured to support the pulley main body; and a casing configured to accommodate and support the wire winding part, the rotary actuator and the pulley.

In addition, an inspection cable insertion jig according to the present disclosure is an inspection cable insertion jig connected to the inspection cable guide mechanism from a side opposite to the tip and inserted into an inspection object together with the inspection cable guide mechanism, the inspection cable insertion jig including: a plurality of split pipes having main body sections forming a cylindrical shape, covering the heat-resistant sheath and the wire from the outside and arranged at an interval in the centerline direction, and slide sections forming a cylindrical shape, surrounding the main body section from an outer circumferential side thereof and provided on the main body section to be slidable in the centerline direction; a plurality of half split pipes forming a half-cylindrical shape and disposed between the neighboring main body sections to fill a space in which the neighboring main body sections are formed at the interval; and a screw configured to fix the slide section to the main body section of the split pipe adjacent to one split pipe of the plurality of split pipes in the centerline direction when the slide section of the one split pipe slides in the centerline direction and covers the half split pipe from the outside.

In addition, an inspection cable insertion jig according to the present disclosure is an inspection cable insertion jig connected to the inspection cable guide mechanism from a side opposite to the tip and inserted into an inspection object together with the inspection cable guide mechanism, the inspection cable insertion jig including: a cable accommodating body through which the heat-resistant sheath is allowed to be inserted, including a plurality of split bodies connected to each other along the centerline and bendable in only one direction; and a bending prevention member provided on the cable accommodating body along the centerline and configured to prevent bending of the cable accommodating body when fixed to the cable accommodating body.

In addition, a gas turbine inspection system according to the present disclosure is a gas turbine inspection system configured to inspect the inside of a gas turbine that is an inspection object, the gas turbine inspection system including: the sensor and the inspection cable; the inspection cable guide mechanism inserted into the turbine following a combustor of the gas turbine through the combustor and configured to guide the inspection cable in the turbine; the driving device disposed outside the gas turbine; the inspection cable insertion jig; an advancing/retreating actuator configured to advance and retreat the driving device toward or away from the combustor; a cooling air supply part configured to supply the cooling air into the gap in the heat-resistant sheath from a side opposite to the tip; and a control device configured to control rotation of the rotary actuator and advance/retreat of the driving device by the advancing/retreating actuator.

According to the present disclosure, it is possible to provide an inspection cable guide mechanism, a driving device, an inspection cable insertion jig, and a gas turbine inspection system that are allowed to inspect the inside of an inspection object even under a high temperature environment.

BRIEF DESCRIPTION OF THE DRAWINGS

FIG. 23 is a view showing a configuration of a driving device and an inspection cable guide mechanism according to another embodiment of the present disclosure.

DETAILED DESCRIPTION OF THE INVENTION

Hereinafter, a gas turbine according to an embodiment of the present disclosure and an inspection system of the gas turbine are described with reference to the accompanying drawings.

First Embodiment (Gas Turbine)

Figure 1:
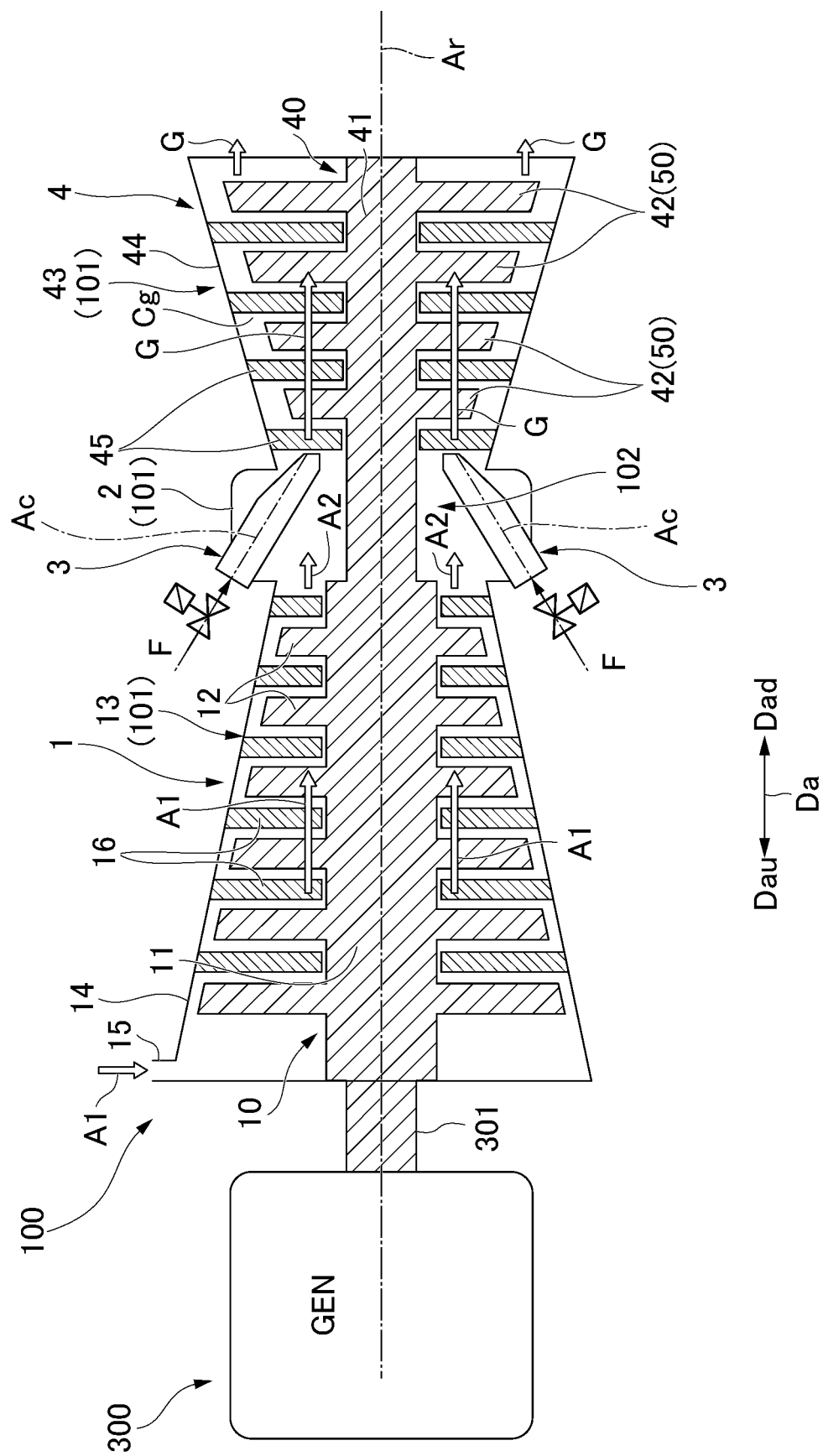
FIG. 1 is a schematic diagram showing a schematic configuration of a gas turbine according to an embodiment of the present disclosure.

As shown in FIG. 1, a gas turbine 100 includes a compressor 1, an intermediate casing 2, a combustor 3, and a turbine 4.

(Compressor)

The compressor 1 is a device configured to compress air introduced from the outside to increase the air pressure to a predetermined pressure, and supply the compressed air into the intermediate casing 2. The compressor 1 includes a compressor rotor 10 that is able to rotate around a rotor axis Ar extending in a horizontal direction as a center, and a compressor casing 13 configured to cover the compressor rotor 10.

Here, a direction in which the rotor axis Ar extends (a leftward/rightward direction in FIG. 1) is referred to as "a rotor axis direction Da." In addition, of both sides in the rotor axis direction Da, one side (a left side in FIG. 1) is referred to as "an axis upstream side Dau" and an opposite side (a right side in FIG. 1) is referred to as "an axis downstream side Dad." In addition, air introduced into the compressor 1 and flowing through the compressor 1 is simply referred to as "air A1" and the air A1 introduced into the intermediate casing 2 after being compressed by the compressor 1 is referred to as "compressed air A2."

The compressor rotor 10 includes a compressor rotor shaft 11, and a plurality of compressor rotor vane cascades 12 provided on an outer circumferential surface of the compressor rotor shaft 11 and arranged at intervals in the rotor axis direction Da.

The compressor rotor shaft 11 is a rotary shaft that forms a columnar shape extending in the rotor axis direction Da and is rotatable around the rotor axis Ar. The plurality of compressor rotor vane cascades 12 are all provided from the outer circumferential side of the compressor rotor shaft 11 and integrated with the compressor rotor shaft 11. Each of the compressor rotor vane cascades 12 includes a plurality of compressor rotor vanes arranged at intervals in a circumferential direction of the compressor rotor shaft 11.

The compressor casing 13 forms an outer shell of the compressor 1 and covers the compressor rotor 10 from the outer circumferential side thereof. The compressor casing 13 includes a compressor casing main body 14 that forms a cylindrical shape using the rotor axis Ar as a center, an air inlet part 15 configured to introduce the air A1 into the compressor casing main body 14, and a plurality of compressor stator vane rows 16 provided on the inner circumferential surface of the compressor casing main body 14 and arranged at intervals in the rotor axis direction Da.

The compressor casing main body 14 is supported by a compressor support part (not shown) fixed to, for example, the ground, a frame, or the like. The compressor casing main body 14 compresses the air A1 introduced from the air inlet part 15 to generate the compressed air A2, and then supplies the compressed air A2 to the intermediate casing 2. The air inlet part 15 is provided on the axis upstream side Dau of the compressor casing main body 14.

Each of the plurality of compressor stator vane rows 16 is integrated with the compressor casing main body 14. Each of the compressor stator vane rows 16 includes a plurality of compressor stator vanes arranged at intervals in the circumferential direction of the compressor rotor shaft 11. The compressor stator vane rows 16 and the compressor rotor vane cascades 12 are alternately arranged in the rotor axis direction Da. The compressed air A2 compressed in the compressor casing 13 is introduced into the intermediate casing 2.

(Intermediate Casing)

The intermediate casing 2 forms a space therein to guide the compressed air A2 introduced from the compressor 1 to the combustor 3. The intermediate casing 2 is connected to the compressor casing 13 from the axis downstream side Dad.

(Combustor)

The combustor 3 is a device configured to generate a combustion gas G with a high temperature and a high pressure using fuel F supplied from the outside and the compressed air A2 introduced into the intermediate casing 2, and supply the combustion gas G to the turbine 4.

The combustor 3 is provided on the intermediate casing 2, and extends about a combustor axis Ac extending across the rotor axis Ar. Hereinafter, the direction in which the combustor axis Ac extends is referred to as "a combustor axis direction Dac."

(Turbine)

The turbine 4 is a device driven by the combustion gas G supplied from the combustor 3. The turbine 4 includes a turbine rotor 40 that is rotatable about the rotor axis Ar, and a turbine casing 43 configured to cover the turbine rotor 40.

The turbine rotor 40 includes a turbine rotor shaft 41, and a plurality of turbine rotor vane cascades 42 provided on the outer circumferential surface of the turbine rotor shaft 41 and arranged at intervals in the rotor axis direction Da.

The turbine rotor shaft 41 is a rotary shaft that forms a columnar shape extending in the rotor axis direction Da and is rotatable around the rotor axis Ar. The plurality of turbine rotor vane cascades 42 are all provided from the outer circumferential side of the turbine rotor shaft 41 and integrated with the turbine rotor shaft 41. Each of the turbine rotor vane cascades 42 includes a plurality of turbine rotor vanes arranged at intervals in the circumferential direction of the turbine rotor shaft 41.

The turbine casing 43 forms an outer shell of the turbine 4 and covers the turbine rotor 40 from the outer circumferential side. The turbine casing 43 includes a turbine casing main body 44 that forms a cylindrical shape about the rotor axis Ar, and a plurality of turbine stator vane rows 45 provided on the inner circumferential surface of the turbine casing main body 44 and arranged at intervals in the rotor axis direction Da.

The turbine casing main body 44 is supported by a turbine support part (not shown) fixed to, for example, the ground, a frame, or the like. The turbine casing main body 44 causes the combustion gas G introduced from the combustor 3 to flow therethrough. The combustion gas G is introduced from the axis upstream side Dau of the turbine casing main body 44. The plurality of turbine stator vane rows 45 are all integrated with the turbine casing main body 44.

Each of the turbine stator vane rows 45 includes a plurality of turbine stator vanes arranged at intervals in the circumferential direction of the turbine rotor shaft 41. The turbine stator vane rows 45 and the turbine rotor vane cascades 42 are alternately arranged in the rotor axis direction Da. The combustion gas G after finishing its work in the turbine casing main body 44 is discharged from the turbine casing main body 44 toward the axis downstream side Dad.

An annular space in which the turbine stator vane rows 45 and the turbine rotor vane cascades 42 are disposed in the axial direction between the outer circumferential side of the turbine rotor shaft 41 and the inner circumferential side of the turbine casing main body 44 is a combustion gas flow channel Cg through which the combustion gas G from the combustor 3 flows. The combustion gas flow channel Cg forms an annular shape about the rotor axis Ar and is long in the rotor axis direction Da.

In the embodiment, a gas turbine casing 101 is constituted by the compressor casing 13, the intermediate casing 2, and the turbine casing 43. In addition, the compressor rotor 10 and the turbine rotor 40 are located on the same axis, and, for example, are connected to each other in the intermediate casing 2 to constitute a gas turbine rotor 102. For example, a generator output shaft 301 included in a generator 300 is connected to an end portion of the gas turbine rotor 102 (the compressor rotor 10) on the axis upstream side Dau.

Hereinafter, a schematic operation of the gas turbine 100 including the above configuration are described. The compressor 1 compresses the air A1 to generate the compressed air A2. The compressed air A2 flows into the combustor 3 through the intermediate casing 2. The fuel F is supplied to the combustor 3 from the outside.

In the combustor 3, the fuel F is combusted in the compressed air A2, and the combustion gas G with a high temperature and a high pressure is generated. The combustion gas G is sent from the combustor 3 into the turbine casing 43. The turbine rotor 40 is rotated by the combustion gas G. The generator output shaft 301 of the generator 300 connected to the gas turbine rotor 102 is rotated according to rotation of the turbine rotor 40. As a result, the generator 300 generates electric power.

(Gas Turbine Inspection System)

A gas turbine inspection system 200 is a system configured to inspect for abnormalities, defects, or the like, in the turbine 4 of the gas turbine 100 when the gas turbine 100 as the inspection object is shut down.

Figure 2:
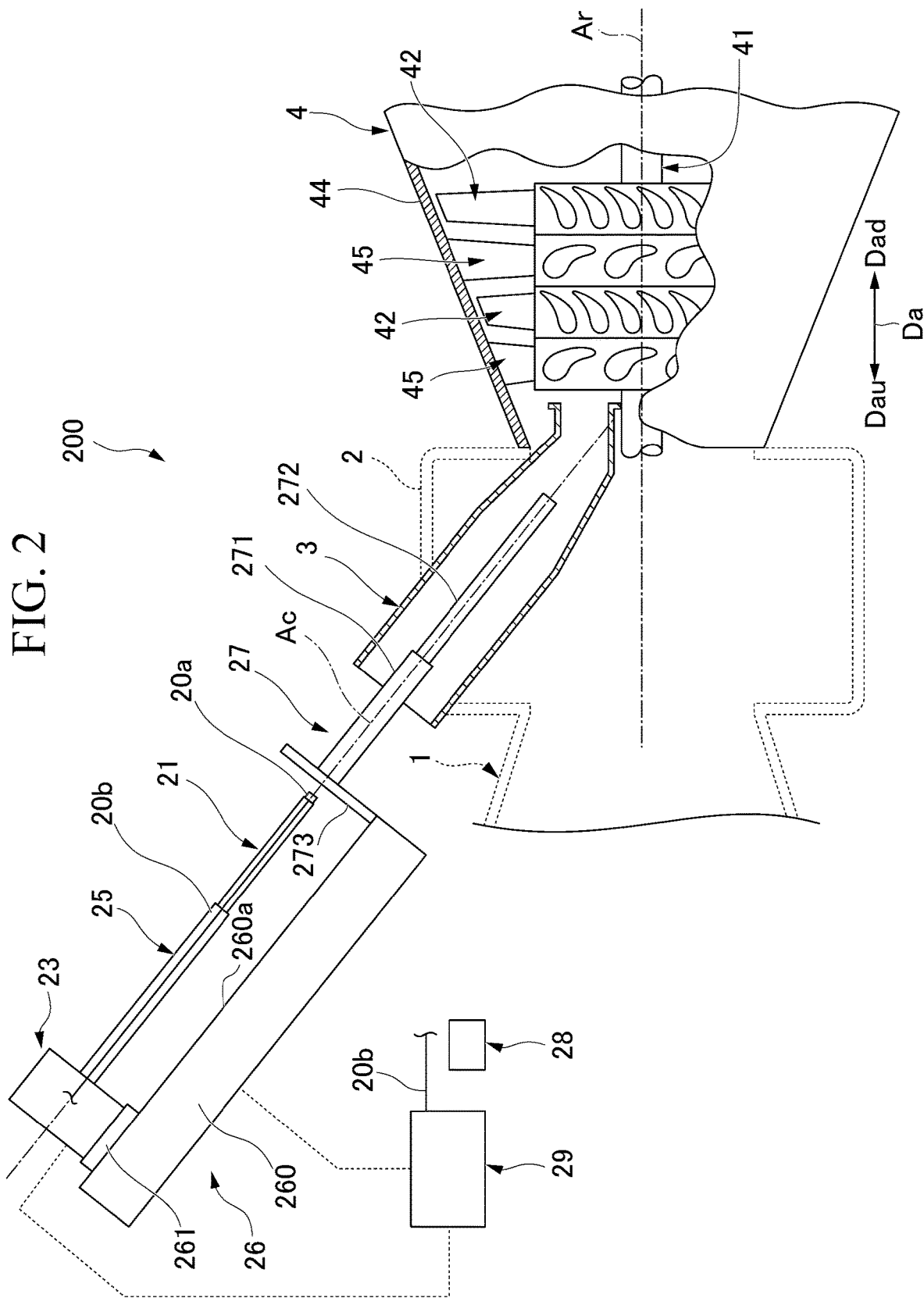
FIG. 2 is a schematic diagram showing a schematic configuration of a gas turbine inspection system according to the embodiment of the present disclosure.

As shown in FIG. 2, the gas turbine inspection system 200 includes a sensor 20a, an inspection cable 20b, an inspection cable guide mechanism 21, a driving device 23, an inspection cable insertion jig 25, an advancing/retreating actuator 26, a guide pipe 27, a cooling air supply part 28, and a control device 29.

(Sensor)

Figure 3:
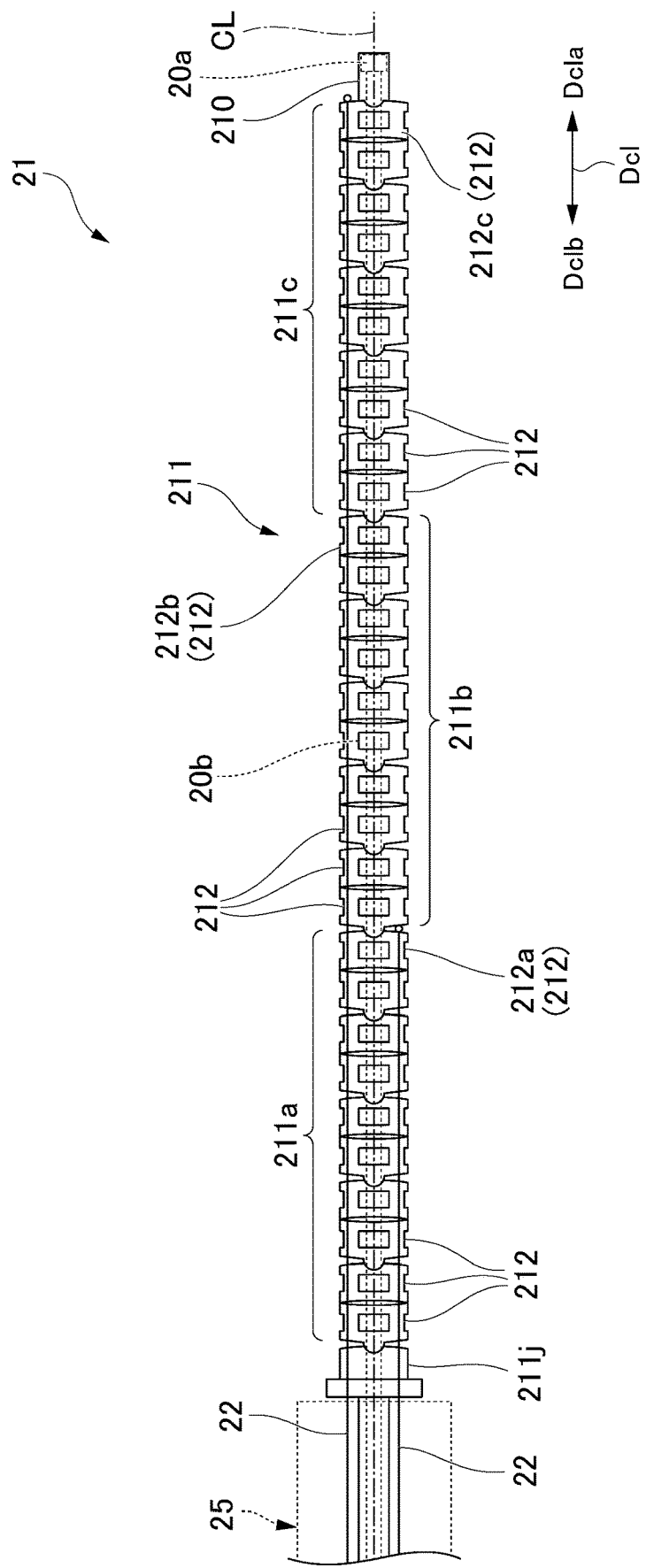
FIG. 3 is a view showing a configuration of an inspection cable guide mechanism according to a first embodiment of the present disclosure.

As shown in FIG. 2 and FIG. 3, the sensor 20a is a sensor module in which a semiconductor element (a solid-state image sensing device) such as a CCD image sensor, a CMOS image sensor, or the like is incorporated. The sensor 20a is introduced into the turbine 4 to image an aspect of the inside of the turbine 4.

(Inspection Cable)

The inspection cable 20b is a coaxial cable that can exchange electrical signals between an external device and the sensor 20a. The sensor 20a is provided on a tip of the inspection cable 20b. The inspection cable 20b is formed by, for example, covering a plurality of bundled core wires (signal lines) with an insulator material such as a synthetic resin or the like from the outside.

In addition, a virtual centerline of the inspection cable 20b is simply referred to as "a centerline CL" and a direction in which the centerline CL extends is referred to as "a centerline direction Dcl." Of both sides in the centerline direction Dcl, one side directed toward a tip side (a right side in FIG. 3) is referred to as "a tip side Dcla" and an opposite side thereof (a left side in FIG. 3) is referred to as "a rear end side Dclb."

(Inspection Cable Guide Mechanism)

The inspection cable guide mechanism 21 is a mechanism configured to guide the inspection cable 20b by adjusting a position and a posture of the inspection cable 20b in the turbine 4. As shown in FIG. 3, the inspection cable guide mechanism 21 includes a heat-resistant sheath 210, a segment stacked body 211, and a plurality of wires 22.

(Heat-Resistant Sheath)

The heat-resistant sheath 210 is a coating that covers the inspection cable 20b from the outside and protects the inspection cable 20b from heat. The heat-resistant sheath 210 is a tube-shaped member through which the inspection cable 20b can be inserted. The heat-resistant sheath 210 is formed of a material having flexibility and heat resistance. For example, a synthetic resin or the like is adopted as the material that forms the heat-resistant sheath 210 according to the present embodiment.

Figure 4:
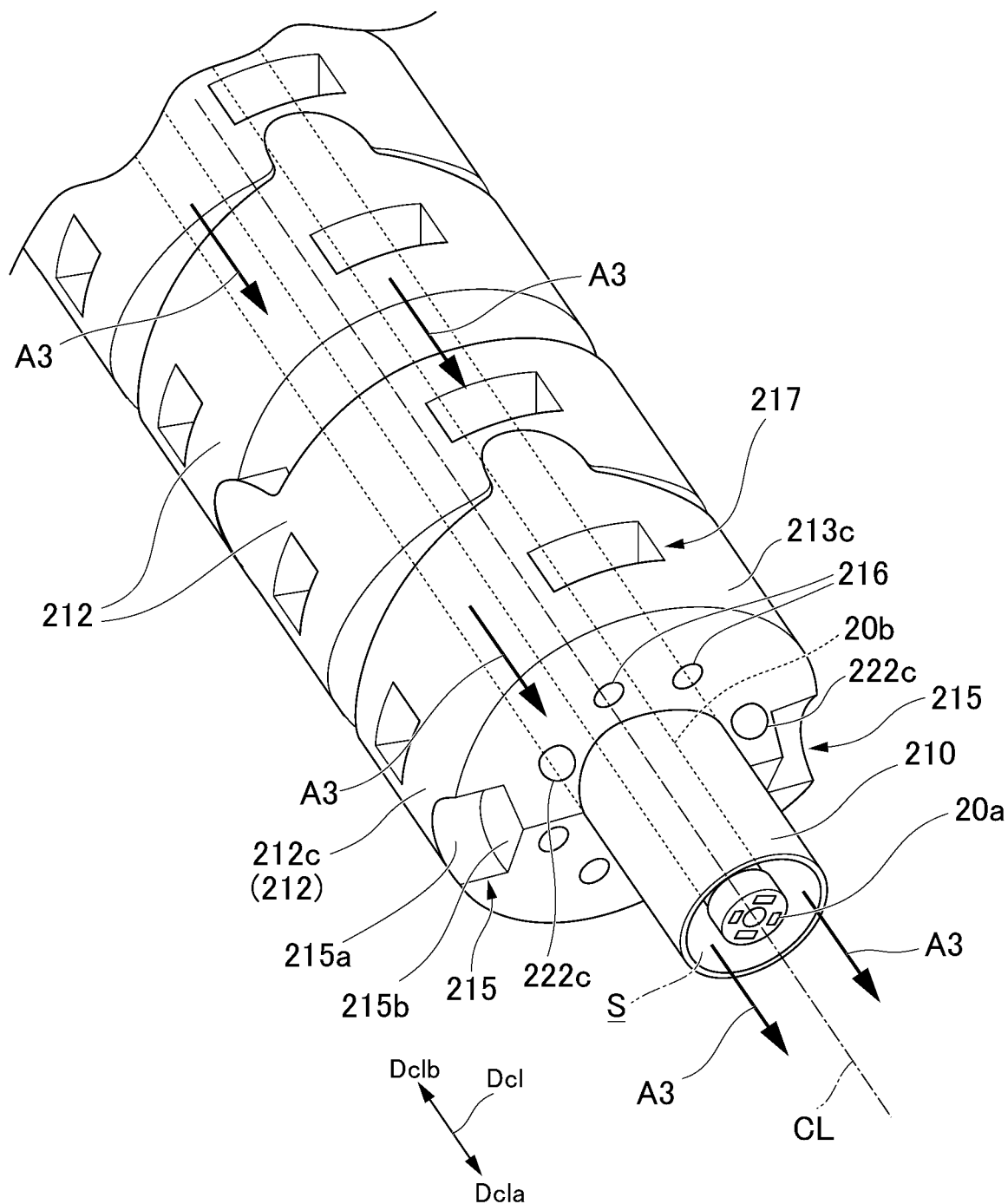
FIG. 4 is a view showing an aspect of a gap formed between a heat-resistant sheath and an inspection cable according to the first embodiment of the present disclosure.

As shown in FIG. 4, a gap S is formed between the inner circumferential surface of the heat-resistant sheath 210 and the inspection cable 20b in the heat-resistant sheath 210. Cooling air A3 is supplied into the gap S from an end portion of the heat-resistant sheath 210 on a side opposite to the tip side Dcla (the rear end side Dclb) by a device provided outside the inspection cable guide mechanism 21. The cooling air A3 supplied to the gap S flows toward the tip through the heat-resistant sheath 210, and then is discharged from the end portion of the heat-resistant sheath 210 on the tip side Dcla.

(Segment Stacked Body)

As shown in FIG. 3, the segment stacked body 211 is a member configured to cover the heat-resistant sheath 210 from the outside and able to adjust a position and a posture of the inspection cable 20b passing through the heat-resistant sheath 210 together with heat-resistant sheath 210. The segment stacked body 211 is formed by stacking three or more segments 212 in the centerline direction Del that cover the heat-resistant sheath 210 from the outside.

The segment stacked body 211 includes a first joint section 211a, a second joint section 211b, a third joint section 211c, and a connecting section 211j. Each of the first joint section 211a, the second joint section 211b, and the third joint section 211c of the embodiment are configured by stacking ten segments 212 in the centerline direction Del.

Accordingly, the segment stacked body 211 is configured by stacking thirty segments 212 in the centerline direction Del. The connecting section 211j is a member configured to connect the inspection cable insertion jig 25 connected to the inspection cable guide mechanism 21 from the rear end side Dclb and the segment 212 located on the most rear end side Dclb of the first joint section 211a.

The first joint section 211a, the second joint section 211b, the third joint section 211c and the connecting section 211j are arranged in sequence from the rear end side Dclb of the connecting section 211j, the first joint section 211a, the second joint section 211b and the third joint section 211c in the centerline direction Dcl.

(Segments)

Figure 5:
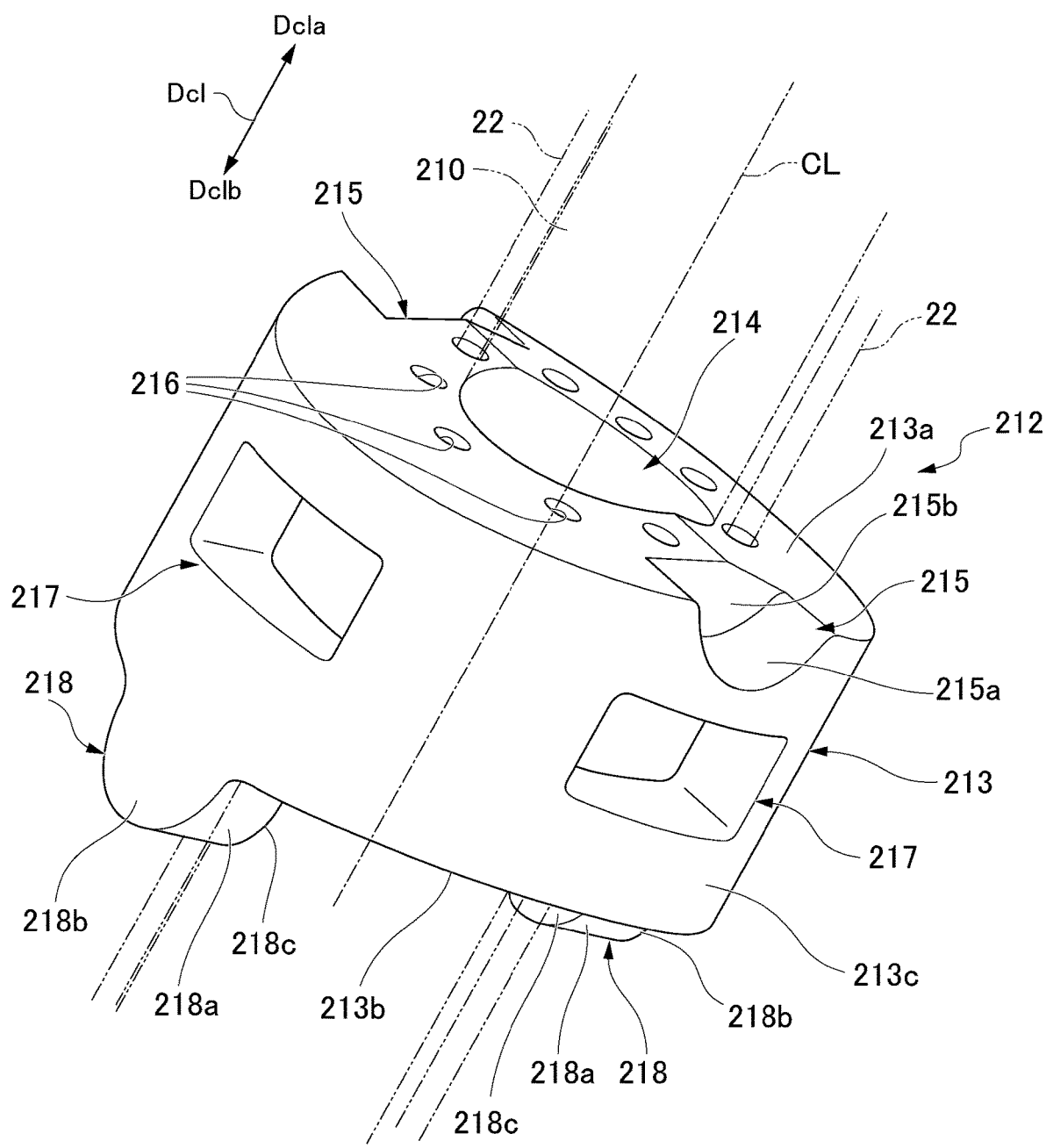
FIG. 5 is a view showing a configuration of a segment of the first embodiment of the present disclosure.

The segment 212 is formed of a metal having heat resistance. For example, titanium alloy or the like is adopted as a material that forms the segments 212 according to the present embodiment. As shown in FIG. 5, each of the segments 212 includes a segment main body 213 that forms a cylindrical shape about the centerline CL when a plurality of segments are stacked in the centerline direction Dcl, and a pair of protruding portions 218 protruding from the segment main body 213. Hereinafter, a configuration of each element included in the segment stacked body 211 when the plurality of segments 212 are stacked in the centerline direction Dcl are described.

The segment main body 213 includes a tip surface 213a facing the tip side Dcla, a rear end surface 213b facing the rear end side Dclb, and an outer circumferential surface 213c as a side surface that connects the tip surface 213a and the rear end surface 213b in the centerline direction Dcl.

The tip surface 213a is constituted by a pair of surfaces that incline and cross each other to form an intersection line at the most tip side Dcla of the segment main body 213. The rear end surface 213b is constituted by a pair of surfaces that incline and cross each other to form an intersection line at the most rear end side Dclb of the segment main body 213. The intersection line formed by the pair of surfaces in the tip surface 213a and the intersection line formed by the pair of surfaces in the rear end surface 213b are perpendicular to each other when seen in the centerline direction Dcl.

Through-holes 214 passing through the segment main bodies 213 along the centerline CL from the tip surface 213a toward the rear end surface 213b are formed in the segment main bodies 213. The through-holes 214 formed in the segment main bodies 213 neighboring in the centerline direction Dcl are continuous such that the heat-resistant sheath 210 can be inserted through these through-holes 214.

The segment main body 213 includes a pair of recessed portions 215 formed to have shapes similar to shapes in which a part of the tip surface 213a and the outer peripheral surface 213c are cut out. The pair of recessed portions 215 are disposed to sandwich the through-hole 214 therebetween. Each of the recessed portions 215 is constituted by a recessed surface 215a and a recessed portion abutting surface 215b.

The recessed surface 215a is a surface formed in a cylindrical side surface shape having a predetermined radius of curvature. The recessed surface 215a is formed to be recessed from the tip surface 213a toward the rear end surface 213b. The recessed portion abutting surface 215b is a surface that connects the recessed surface 215a and the tip surface 213a and facing toward the side of the outer circumferential surface 213c from a further inner side than the outer circumferential surface 213c. The recessed portion abutting surfaces 215b of the pair of recessed portions 215 have a relationship parallel to each other.

Figure 6A:
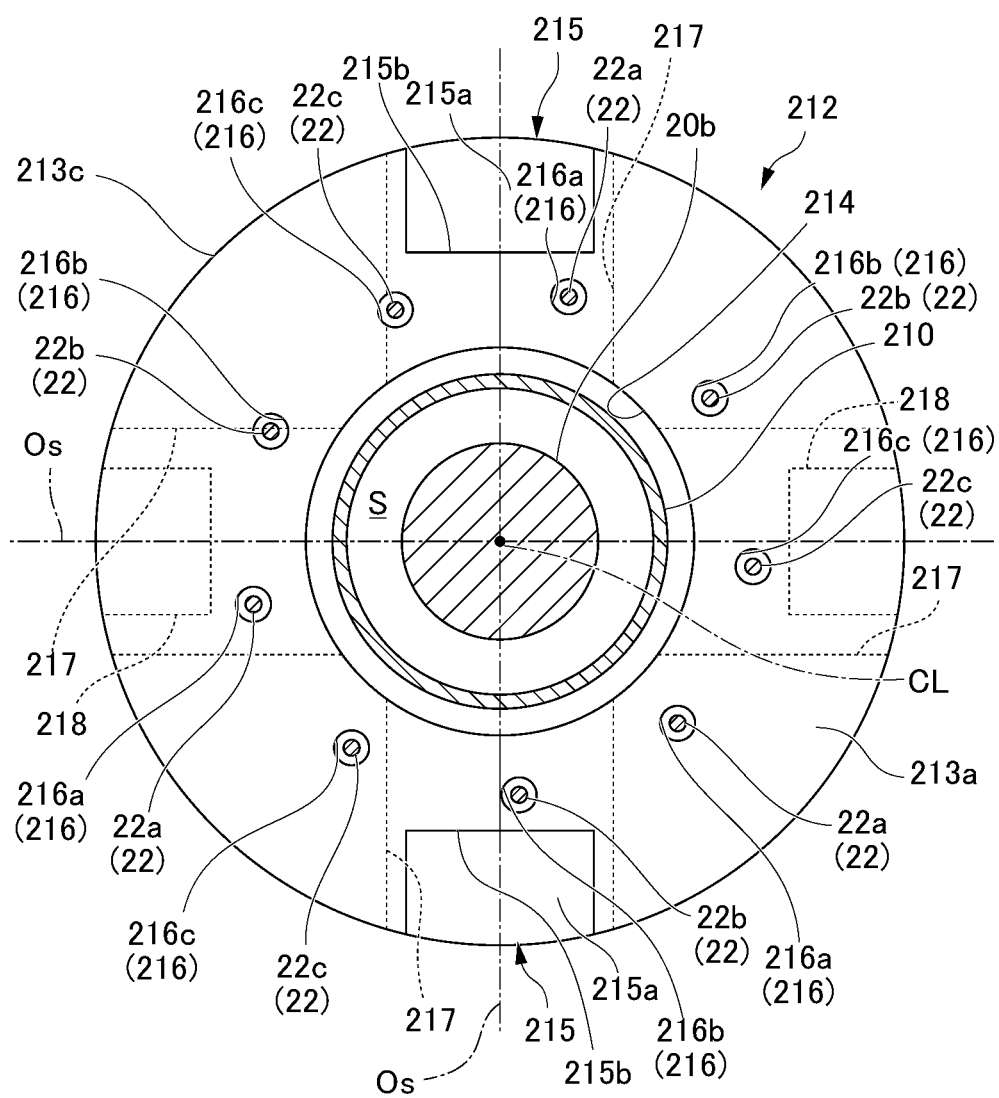
FIG. 6A is a view showing the segment according to the first embodiment of the present disclosure when viewed from a tip side.
Figure 6B:
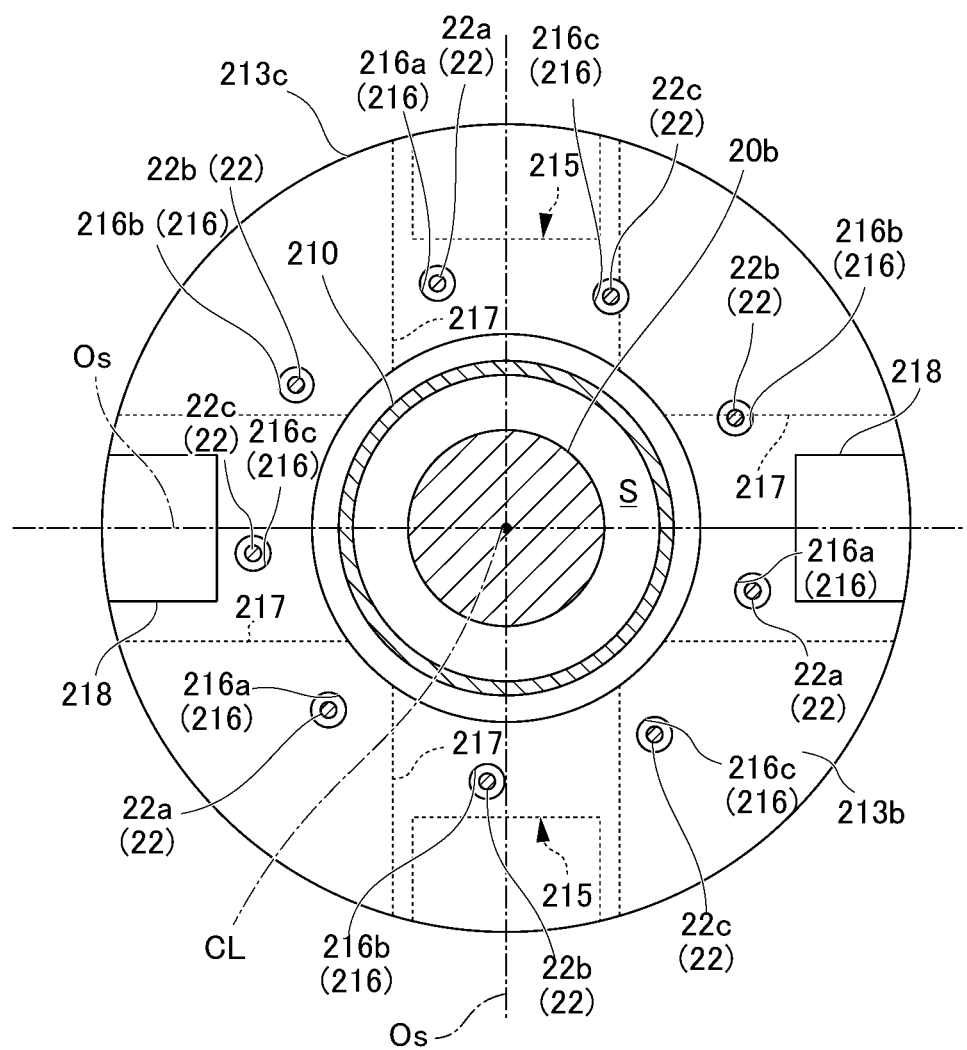
FIG. 6B is a view showing the segment according to the first embodiment of the present disclosure when viewed from a rear end side.

A plurality of wire insertion holes 216 through which the wires 22 can be inserted in the centerline direction Dcl are formed in the segment main body 213. Each of the wire insertion holes 216 penetrates the segment main body 213 from the tip surface 213a to the rear end surface 213b. As shown in FIG. 6A and FIG. 6B, the plurality of wire insertion holes 216 are disposed at equal intervals around the through-hole 214. Nine wire insertion holes 216 are disposed on the segment main body 213 according to the present embodiment at equal intervals around the through-hole 214.

In addition, as shown in FIG. 5, a plurality of weight-reducing holes 217 are formed in the segment main body 213 to pass therethrough from the outer circumferential surface 213c to the inner circumferential surface of the through-hole 214. Four weight-reducing holes 217 that form a rectangular shape when seen in a front view are disposed on the segment main body 213 according to the present embodiment at equal intervals around the centerline CL about the centerline CL.

The pair of protruding portions 218 protrude from the rear end surface 213b of the segment main body 213 to the rear end side Dclb integrally with the segment main body 213. The pair of protruding portions 218 are disposed to sandwich the through-hole 214 therebetween. Here, as shown in FIG. 6A and FIG. 6B, a direction in which the pair of protruding portions 218 are arranged when seen in the centerline direction Dcl is perpendicular to a direction in which the pair of recessed portions 215 are arranged in the segment main body 213.

Each of the protruding portions 218 is constituted by a protruding surface 218a, a protruding portion outer surface 218b, and a protruding portion abutting surface 218c. The protruding surface 218a is a surface formed in a cylindrical side surface shape having a radius of curvature smaller than that of the recessed surface 215a of the recessed portion 215 formed in the segment main body 213.

The protruding portion outer surface 218b is a surface that connects the protruding surface 218a and the outer circumferential surface 213c of the segment main body 213. The protruding portion outer surface 218b is directed outward to be flush with the outer circumferential surface 213c of the segment main body 213. The protruding portion abutting surface 218c is a surface that connects the protruding surface 218a and the rear end surface 213b.

Figure 7:
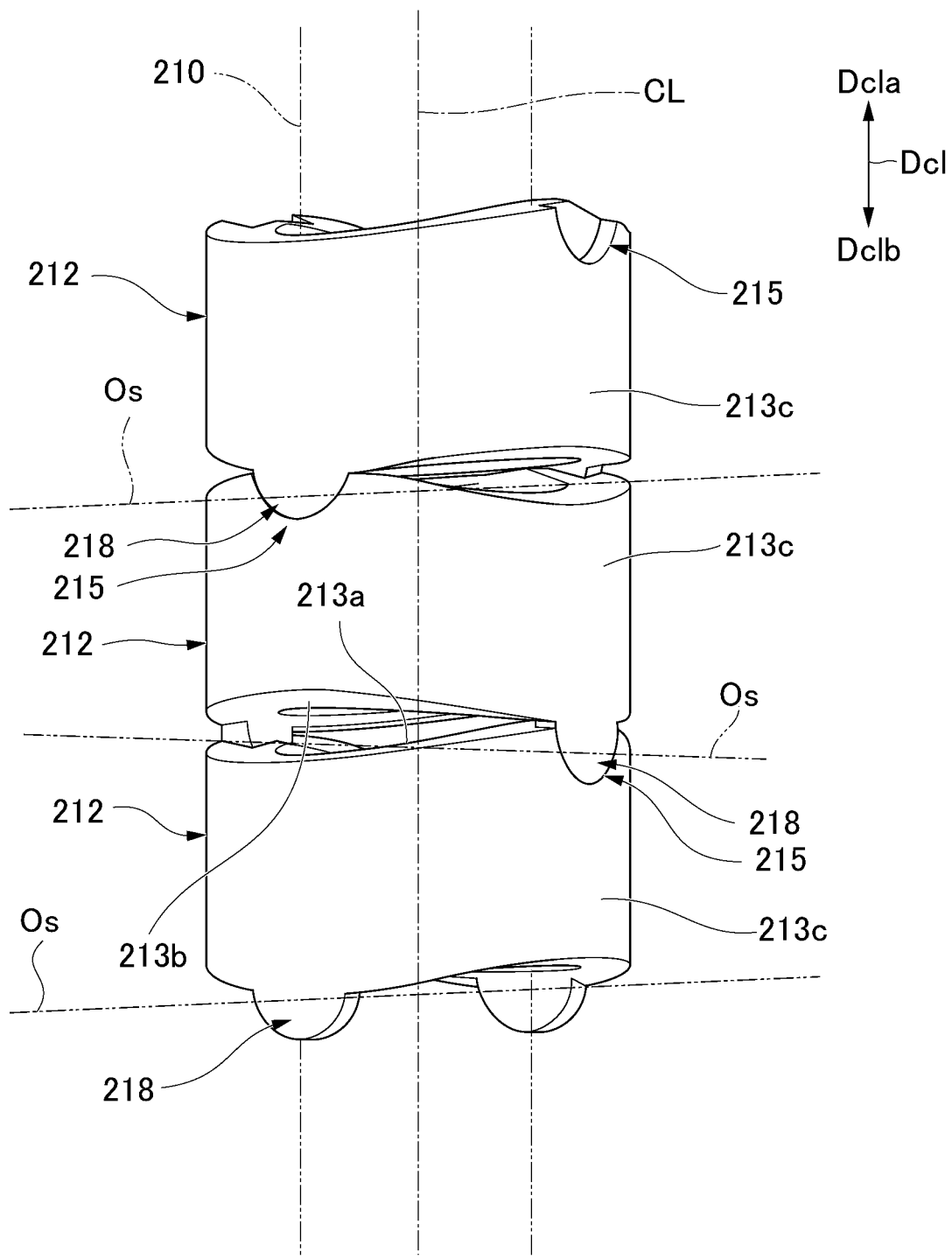
FIG. 7 is a view for describing a direction in which each of the plurality of segments swings when the segments according to the first embodiment of the present disclosure are stacked.

As shown in FIG. 7, the protruding portion 218 of one segment 212 of the segments 212 arranged in the centerline direction Dcl except the segment 212 located on the most rear end side Dclb is fitted into the recessed portion 215 formed in the segment main body 213 of the segment 212 adjacent to the one segment 212 from the rear end side Dclb in the centerline direction Dcl. Further, in FIG. 7, illustration of the weight-reducing holes 217 is omitted.

When the protruding surface 218a of the protruding portion 218 and the recessed surface 215a of the recessed portion 215 abut each other, the segments 212 neighboring in the centerline direction Dcl can swing each other. Here, the protruding portion abutting surface 218c of the protruding portion 218 and the recessed portion abutting surface 215b of the recessed portion 215 abut each other in a direction perpendicular to the centerline CL.

That is, one segment 212 among the segments 212 other than the segments 212 located on the most tip side Dcla and the most rear end side Dclb in the segment stacked body 211 is swingable with respect to each of the two segments 212 adjacent to the one segment 212 in the centerline direction Dcl about swing axes Os extending in directions perpendicular to the centerline CL.

As shown in FIG. 6A, FIG. 6B and FIG. 7, the two swing axes Os that become swing centers when the one segment 212 swings with respect to the two segments 212 adjacent to the one segment 212 in the centerline direction Dcl are perpendicular to each other when viewed in the centerline direction Dcl.

(Wire)

As shown in FIG. 3, the plurality of wires 22 are steel wires extending from a further rear end side Dclb than the segment stacked body 211 toward the segment stacked body 211, and inserted through the wire insertion holes 216 of the segments 212 in the segment stacked body 211 toward the tip along the centerline CL. In FIG. 3, for the convenience of illustration, only the two wires 22 are shown.

As shown in FIG. 6A and FIG. 6B, the plurality of wires 22 according to present the embodiment are constituted by three first jointing wires 22a, three second jointing wires 22b, and three third jointing wires 22c. Accordingly, the inspection cable guide mechanism 21 includes the nine wires 22, and each of the wires 22 is inserted through the wire insertion hole 216 formed in the segment 212.

Here, the nine wire insertion holes 216 formed in the segment main body 213 of each of the segments 212 is divided into three first wire insertion holes 216a, three second wire insertion holes 216b, and three third wire insertion holes 216c. The three first wire insertion holes 216a are disposed at equal intervals around the centerline CL. Similarly, the three second wire insertion holes 216b are disposed at equal intervals around the centerline CL, and the three third wire insertion holes 216c are disposed at equal intervals around the centerline CL.

Only the first jointing wire 22a is inserted through the first wire insertion hole 216a of each of the segments 212 in the first joint section 211a. Only the second jointing wire 22b is inserted through the second wire insertion hole 216b of each of the segments 212 in the first joint section 211a and the second joint section 211b. Only the third jointing wire 22c is inserted through the third wire insertion hole 216c of each of the segments 212 in the first joint section 211a, the second joint section 211b, and the third joint section 211c.

In other words, the first jointing wire 22a is not inserted through the first wire insertion hole 216a of each of the segments 212 in the second joint section 211b and the third joint section 211c, and the second jointing wire 22b is not inserted through the second wire insertion hole 216b of each of the segments 212 in the third joint section 211c.

Figure 8:
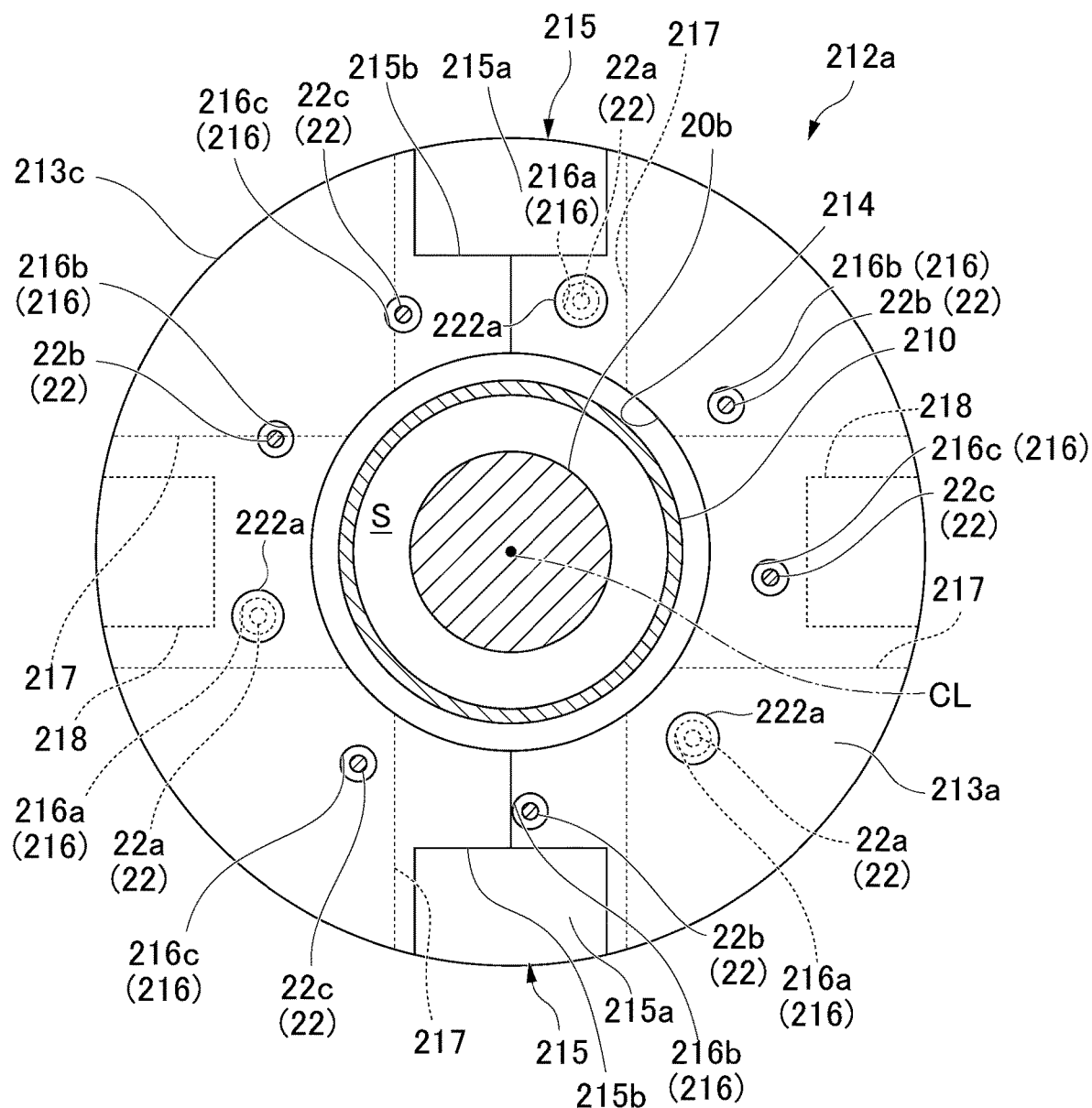
FIG. 8 is a view showing a first segment according to the first embodiment of the present disclosure when viewed from a tip side.

One end of each of the first jointing wires 22a is fixed to the segment 212 disposed on the most tip side Dcla of the first joint section 211a. Hereinafter, for the convenience of description, the segment 212 disposed on the most tip side Dcla of the first joint section 211a is referred to as "the first segment 212a" (see FIG. 3). As shown in FIG. 8, the first jointing wire 22a includes a caulking ball 222a formed on the one end thereof facing the tip side Dcla. A diameter of the caulking ball 222a is greater than a diameter of the first wire insertion hole 216a.

Accordingly, when the first jointing wire 22a is pulled to the rear end side Dclb, since the caulking ball 222a closes an opening of the first wire insertion hole 216a in the tip surface 213a of the first segment 212a from the tip side Dcla, the first jointing wire 22a does not move (leave) in the segment 212 toward the rear end side Dclb.

Figure 9:
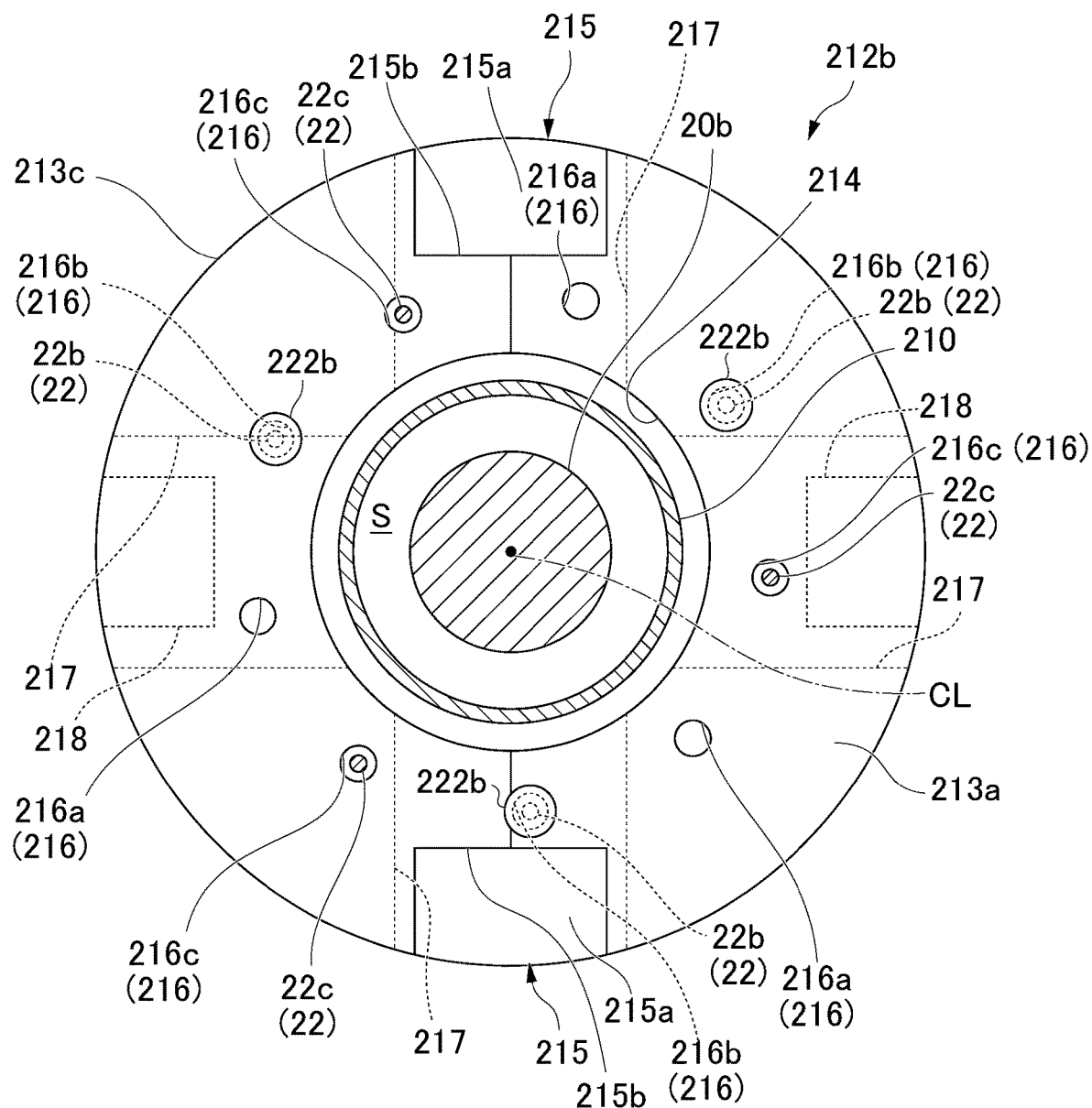
FIG. 9 is a view showing a second segment according to the first embodiment of the present disclosure when viewed from a tip side.

One end of each of the second jointing wires 22b is fixed to the segment 212 disposed on the most tip side Dcla in the second joint section 211b. Hereinafter, for the convenience of description, the segment 212 disposed on the most tip side Dcla in the second joint section 211b is referred to as "the second segment 212b" (see FIG. 3). As shown in FIG. 9, the second jointing wire 22b includes a caulking ball 222b formed on the one end thereof facing the tip side Dcla. A diameter of the caulking ball 222b is greater than a diameter of the second wire insertion hole 216b.

Accordingly, when the second jointing wire 22b is pulled to the rear end side Dclb, the caulking ball 222b closes an opening of the second wire insertion hole 216b in the tip surface 213a of the second segment 212b from the tip side Dcla, the second jointing wire 22b does not move (leave) in the segment 212 toward the rear end side Dclb.

Figure 10:
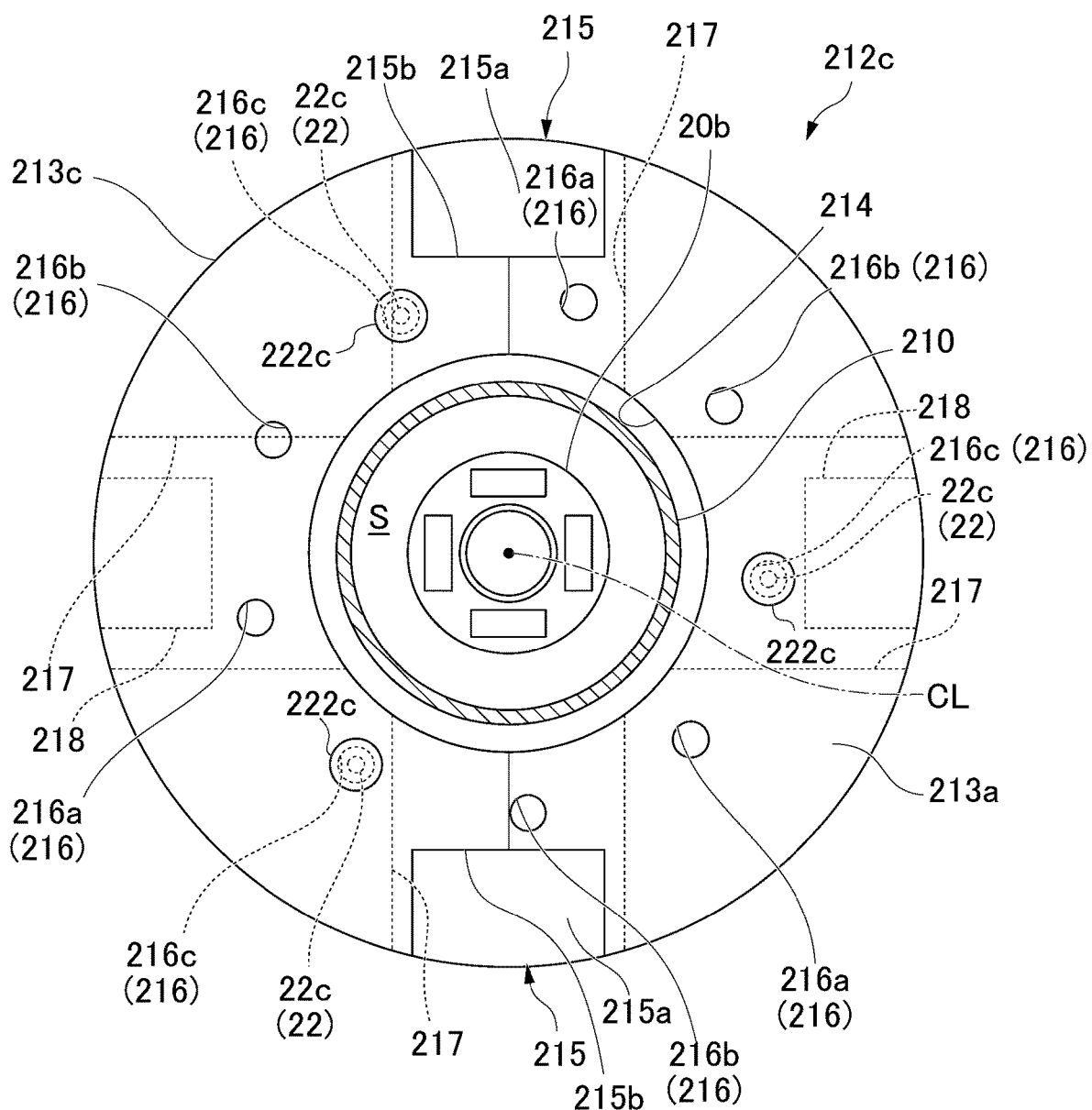
FIG. 10 is a view showing a third segment according to the first embodiment of the present disclosure when viewed from a tip side.

One end of each of the third jointing wires 22c is fixed to the segment 212 disposed on the most tip side Dcla in the third joint section 211c. Hereinafter, for the convenience of description, the segment 212 disposed on the most tip side Dcla in the third joint section 211c is referred to as "the third segment 212c" (see FIG. 3). As shown in FIG. 10, the third jointing wire 22c includes a caulking ball 222c formed on the one end thereof facing the tip side Dcla. A diameter of the caulking ball 222c is greater than a diameter of the third wire insertion hole 216c.

Accordingly, when the third jointing wire 22c is pulled to the rear end side Dclb, since the caulking ball 222c closes an opening of the third wire insertion hole 216c in the tip surface 213a of the third segment 212c from the tip side Dcla, the third jointing wire 22c does not move (leave) in the segment 212 toward the rear end side Dclb.

Figure 11:
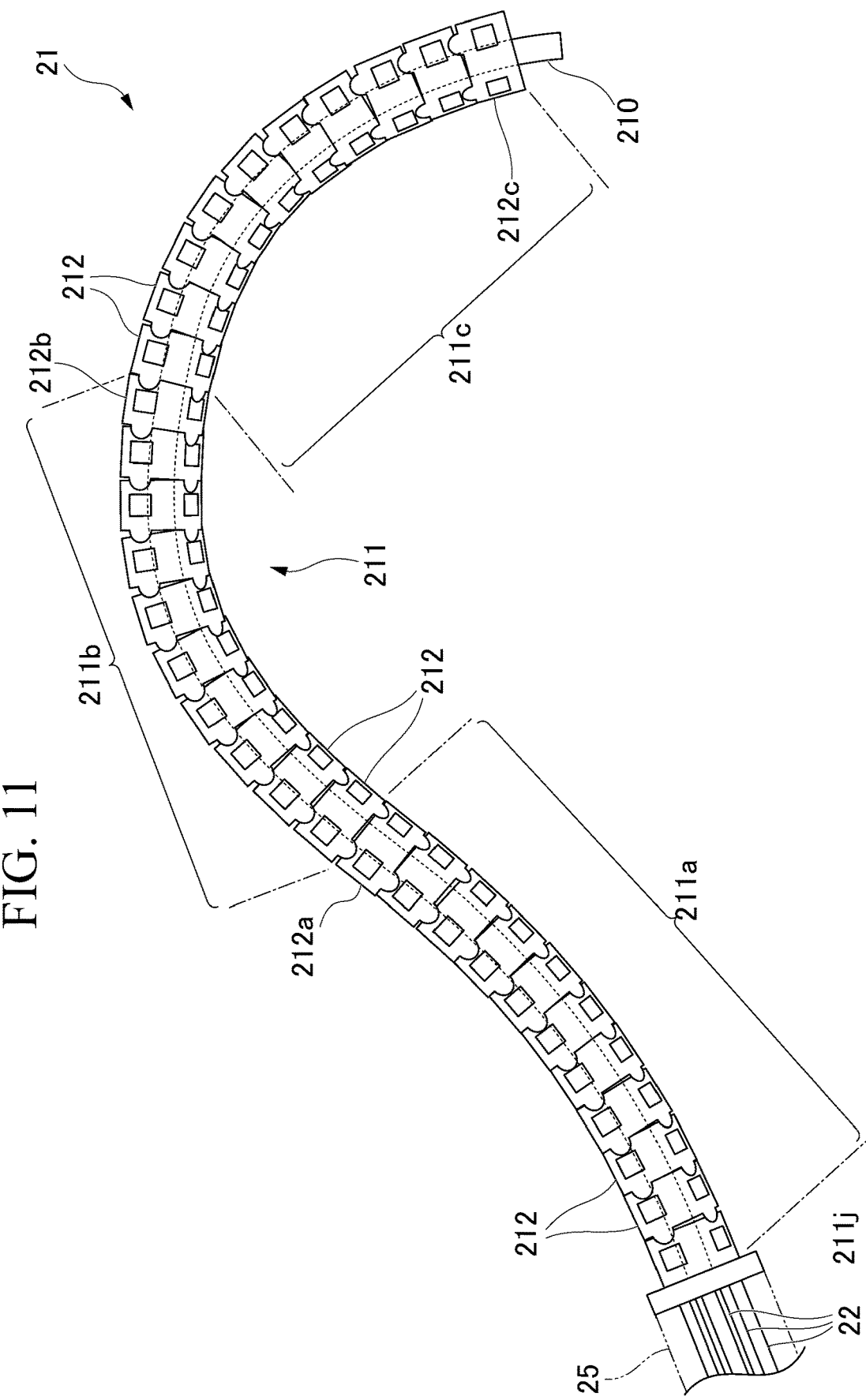
FIG. 11 is a view showing an aspect when a segment stacked body according to the first embodiment of the present disclosure is curved.

Accordingly, when some wires 22 of the plurality of wires 22 are pulled away from the tip or pushed toward the tip, for example, as shown in FIG. 11, the segment stacked body 211 can be 3-dimensionally curved together with the heat-resistant sheath 210. That is, the segment stacked body 211 introduced into the turbine 4 can adjust a position and a posture of the inspection cable 20b by operating the wires 22 from the outside.

(Driving Device)

Figure 12:
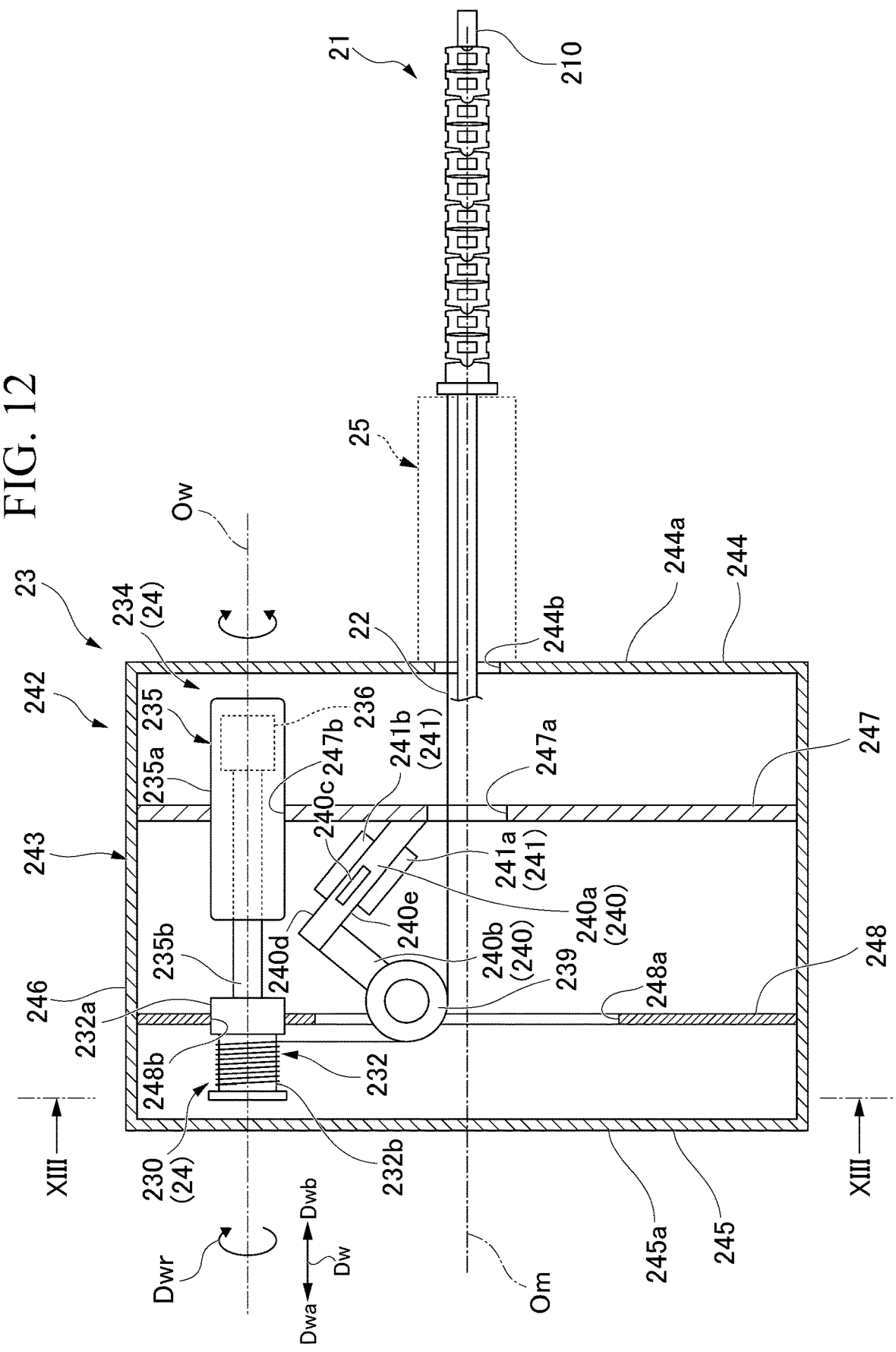
FIG. 12 is a view showing a configuration of a driving device according to the first embodiment of the present disclosure.

The driving device 23 is a device configured to drive the inspection cable guide mechanism 21 by pulling the wires 22 away from the tip or pushing the wires 22 toward the tip. As shown in FIG. 12, the driving device 23 includes a casing 242 and a wire driving mechanism 24.

(Casing)

The casing 242 accommodates the wire driving mechanism 24 configured to drive the inspection cable guide mechanism 21, and supports various equipment provided in the wire driving mechanism 24. The casing 242 includes a casing main body 243, a first support plate 247, and a second support plate 248. The casing main body 243 forms a cylindrical shape.

The casing main body 243 includes a first end plate 244 with a front surface 244a forming a disk shape and facing the inspection cable guide mechanism 21, a second end plate 245 with a back surface 245a forming a disk shape and facing a side opposite to the front surface 244a, and a connecting plate 246 that connects the first end plate 244 and the second end plate 245. In the embodiment, for the convenience of description, a virtual axis that connects a center of the first end plate 244 and a center of the second end plate 245 is referred to as "a center axis Om."

An insertion hole 244b into which the inspection cable 20b, the heat-resistant sheath 210, and the wires 22 extending from the inspection cable guide mechanism 21 can be inserted is formed in the first end plate 244. The insertion hole 244b is formed to pass through the first end plate 244 about the center axis Om.

The first support plate 247 forms a disk shape, and is fixed to an inner surface of the casing main body 243 integrally with the casing main body 243. The first support plate 247 includes a first hole 247a through which the wires 22 introduced into the casing main body 243 through the insertion hole 244b are inserted in the center axis Om direction, and a plurality of first support holes 247b disposed at equal intervals around the first hole 247a. In FIG. 12, in the convenience of illustration, only one first support hole 247b is shown.

The first hole 247a is formed to pass through the first support plate 247 about the center axis Om. The number of the first support holes 247b is the same as that of the wires 22 included in the inspection cable guide mechanism 21. That is, the number of the first support holes 247b formed in the first support plate 247 according to the present embodiment is nine.

The second support plate 248 forms a disk shape, and is fixed to an inner surface of the casing main body 243 integrally with the casing main body 243 on a side closer to the second end plate 245 than the first support plate 247. The second support plate 248 includes a second hole 248a through which the wires 22 passing through the first hole 247a are inserted in the center axis Om direction, and a plurality of second support holes 248b disposed at equal intervals around the second hole 248a. In FIG. 12, for the convenience of illustration, only one second support hole 248b is shown.

The second hole 248a includes a diameter greater than that of the insertion hole 244b and the first hole 247a. The second hole 248a is formed to pass through the second support plate 248 about the center axis Om. The number of the second support holes 248b is the same as that of the wires 22 included in the inspection cable guide mechanism 21. That is, the number of the second support holes 248b formed in the second support plate 248 according to the present embodiment is nine.

(Wire Driving Mechanism)

The wire driving mechanism 24 is a mechanism configured to pull the wires 22 away from the tip and pushing the wires 22 toward the tip. Here, the driving device 23 according to embodiment includes nine wire driving mechanisms 24. Each of the wire driving mechanisms 24 includes a wire winding part 230, a rotary actuator 234, and a pulley 238. In FIG. 12, for the convenience of illustration, only one wire driving mechanism 24 is shown.

(Wire Winding Part)

The wire winding part 230 winds the wires 22 extending from the inspection cable guide mechanism 21. The wire winding part 230 is accommodated in the casing main body 243. The wire winding part 230 includes a spool 232.

The spool 232 is supported by the second support plate 248 of the casing 242. The spool 232 includes a spool head portion 232a and a spool main body 232b.

The spool head portion 232*a* forms a cylindrical shape extending about the axis thereof, and is inserted through the second support holes 248*b* formed in the second support plate 248. The spool head portion 232*a* is rotatably supported by the second support holes 248*b*. The spool main body 232*b* is a member provided on the spool head portion 232*a* integrally with the spool head portion 232*a* from the side of the second end plate 245, and forming a cylindrical shape extending about a winding axis Ow (the axis) parallel to the center axis Om.

Here, a direction in which the winding axis Ow extends (a leftward/rightward direction in FIG. 12) is referred to as "a winding axis direction Dw." In addition, in both sides in the winding axis direction Dw, one side (a left side in FIG. 12) is simply referred to as "one side Dwa" and a side opposite thereto (a right side in FIG. 12) is simply referred to as "the other side Dwb."

The wires 22 extending through the insertion hole 244*b*, the first hole 247*a*, and the second hole 248*a* from the inspection cable guide mechanism 21 are wound on the spool main body 232*b*. The other end of the wire 22 is fixed to the spool main body 232*b*.

(Rotary Actuator)

The rotary actuator 234 is a device connected to the wire winding part 230 from the other side Dwb and configured to rotate the wire winding part 230. The rotary actuator 234 includes a motor 235 and an encoder 236.

The motor 235 includes a motor main body 235*a* constituted by a stator or the like (not shown), and an output shaft 235*b* to which a rotator or the like (not shown) is fixed and protruding from the motor main body 235*a* to one side Dwa.

The motor main body 235*a* is inserted through the first support holes 247*b* formed in the first support plate 247 and supported by the first support holes 247*b*. A cable or the like (not shown) configured to supply electric power from the outside is connected to the stator of the motor main body 235*a*.

The output shaft 235*b* is provided on the motor main body 235*a*, and includes an end portion protruding toward one side Dwa of the motor main body 235*a*. The spool head portion 232*a* is connected to the end portion of the output shaft 235*b* from one side Dwa. In other words, the output shaft 235*b* of the motor 235 is connected to the spool head portion 232*a* of the spool 232 from the other side Dwb.

Accordingly, the output shaft 235*b* is rotated by supplying electric power to the motor main body 235*a* from the outside. According to rotation of the output shaft 235*b*, a torque is transmitted to the spool 232, and a spool main body 232 is rotated.

The encoder 236 is a device configured to detect a rotation angle of the output shaft 235*b* in the motor main body 235*a* and transmit a detection result to an external device.

(Pulley)

The pulley 238 is a device configured to convert a direction in which the wire 22 extends from the wire winding part 230 toward the segment stacked body 211 of the inspection cable guide mechanism 21 in the midway thereof. The pulley 238 includes a pulley main body 239, a support part 240, and a load cell 241.

The pulley main body 239 is configured to convert a direction of the corresponding wire 22 while supporting the wire 22. The support part 240 is a member provided on the first support plate 247 of the casing 242 and configured to support the pulley main body 239. The support part 240 is constituted by a first support part 240*a* forming a quadrangular columnar shape and having one end fixed to the first support plate 247, and a second support part 240*b* forming a quadrangular columnar shape and configured to connect the other end of the first support part 240*a* and the pulley main body 239.

A support part hole 240*c* passing through surfaces facing opposite directions is formed in the first support part 240*a*. When the support part hole 240*c* is formed in the first support part 240*a*, rigidity of the first support part 240*a* is decreased. An angle formed between the first support part 240*a* and the second support part 240*b* according to the present embodiment is 90°.

The load cell 241 is a load converter having a strain gage configured to detect a load applied to the pulley main body 239 from the wires 22. The load cell 241 includes a first measurement part 241*a* fixed to a first surface 240*d* facing the side of the first support plate 247 in which the support part hole 240*c* in the first support part 240*a* is not formed, and a second measurement part 241*b* facing a side opposite to the first surface 240*d* and fixed to a second surface 240*e* in which the support part hole 240*c* is not formed.

Figure 13:
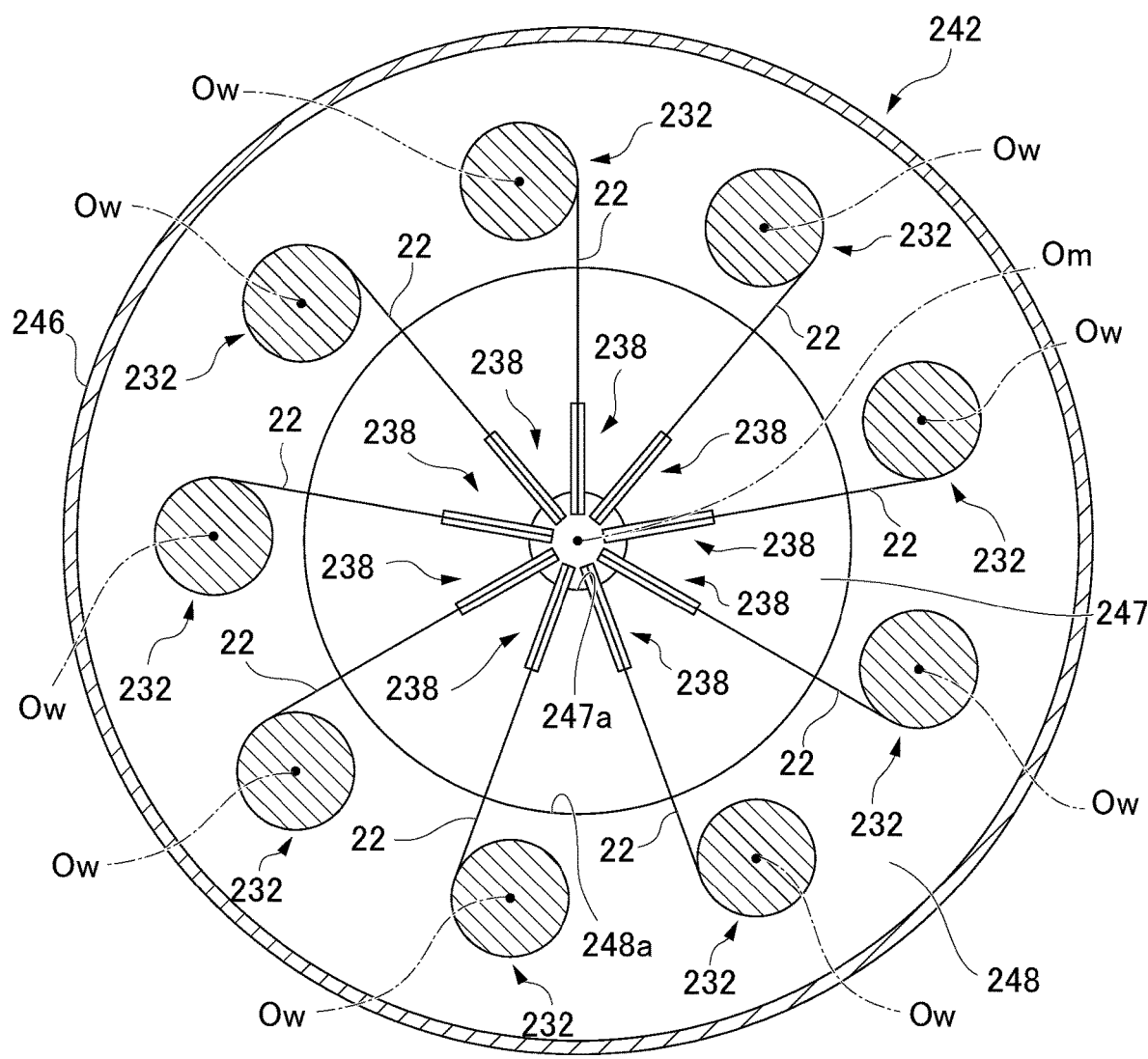
FIG. 13 is a cross-sectional view along line XIII-XIII in FIG. 12.

Here, as shown in FIG. 13, the nine wire driving mechanisms 24 are disposed at equal intervals radially about the center axis Om and to surround the center axis Om.

(Inspection Cable Insertion Jig)

The inspection cable insertion jig 25 is a jig configured to insert the inspection cable 20*b* and the inspection cable guide mechanism 21 into the turbine 4 of the gas turbine 100. The inspection cable insertion jig 25 is connected to the inspection cable guide mechanism 21 from a side opposite to the tip (the rear end side Dclb), and inserted into the turbine 4 together with the inspection cable guide mechanism 21.

Figure 14:
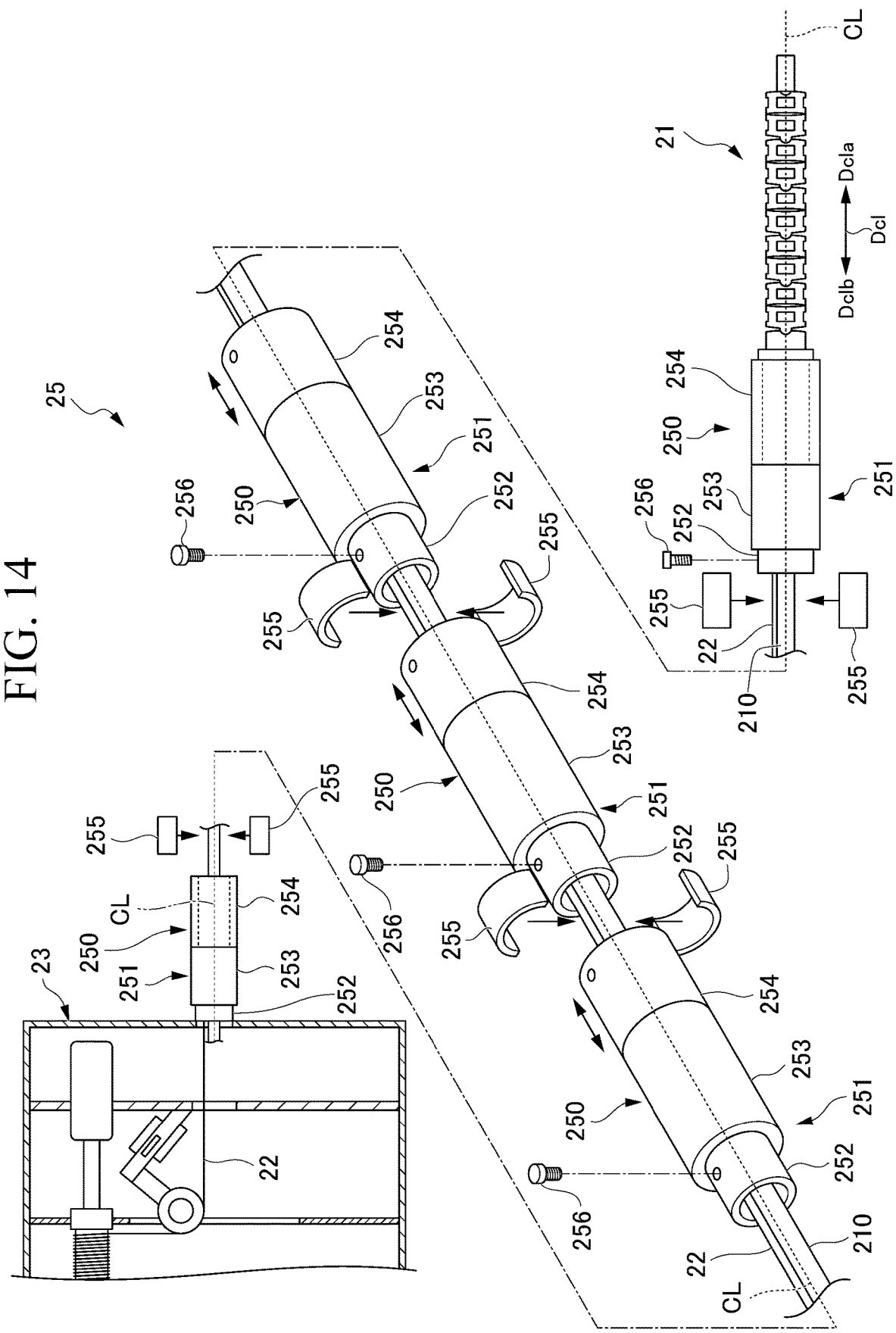
FIG. 14 is a view showing a configuration of an inspection cable insertion jig according to the first embodiment of the present disclosure.

The inspection cable insertion jig 25 is interposed between the inspection cable guide mechanism 21 and the driving device 23. As shown in FIG. 14, the inspection cable insertion jig 25 according to the present embodiment includes a plurality of split pipes 250, a plurality of half split pipes 255, and screws 256.

(Split Pipes)

Each of the split pipes 250 includes a main body section 251 and a slide section 254. The main body section 251 is a tubular member configured to cover the heat-resistant sheath 210 and the wires 22 from the outside. The main body section 251 according to the present embodiment is constituted by an inner tube 252 forming a cylindrical shape, and an outer tube 253 forming a cylindrical shape and formed integrally with the inner tube 252 to surround the inner tube 252 from the outside.

The inner tubes 252 of the split pipes 250 neighboring in the centerline direction Dcl is arranged at an interval in the centerline direction Dcl. That is, a space in which the heat-resistant sheath 210 and the wires 22 are exposed is formed between the neighboring split pipes 250. The outer tube 253 covers the inner tube 252 from the outside in a state in which the end portion of the inner tube 252 in the centerline direction Dcl is exposed.

The slide section 254 is a member forming a cylindrical shape covering a portion of the inner tube 252 that is not covered with the outer tube 253 (an exposed portion) and on the tip side Dcla from the outside. The slide section 254 is provided on the inner tube 252, and slidable with respect to the inner tube 252 in a longitudinal direction.

The half split pipe 255 is a member forming a half-cylindrical shape and disposed between the neighboring main body sections 251 to fill the space formed between the main body sections 251 of the split pipes 250 neighboring in the centerline direction Del. When the pair of half split pipes 255 are combined, the heat-resistant sheath 210 and the wires 22 exposed in the space formed between the inner tubes 252 neighboring in the centerline direction Dcl are covered from the outside.

When the slide section 254 of one split pipe 250 slide in the centerline direction Dcl (the longitudinal direction) and the slide section 254 of the one split pipe 250 covers the half split pipe 255 and the end portion of the inner tube 252 in the split pipe 250 adjacent to the one split pipe 250 from the outside, the screw 256 fixes the slide section 254 to the inner tube 252 of the adjacent main body sections 251.

(Advancing/Retreating Actuator)

As shown in FIG. 2, the advancing/retreating actuator 26 is an electric slider configured to advance and retreat the driving device 23 toward or away from the combustor 3. The advancing/retreating actuator 26 includes a guide rail 260 and an advancing/retreating driving part 261.

The guide rail 260 is a base in which a linear guide (not shown), a servo motor, or the like (not shown) is installed. The advancing/retreating driving part 261 is placed slidably on an upper surface 260a of the guide rail 260. The advancing/retreating driving part 261 advances and retreats (slides) on the guide rail 260 along a linear guide by driving of, for example, a servo motor installed in the guide rail 260.

(Guide Pipe)

The guide pipe 27 is a jig configured to prevent the inspection cable guide mechanism 21 and the inspection cable insertion jig 25 from coming into contact with the combustor 3 while guiding the inspection cable guide mechanism 21 and the inspection cable insertion jig 25 toward the turbine 4 in the combustor 3 when they are introduced into the turbine 4.

The guide pipe 27 is a member provided on the combustor 3 when the inspection cable guide mechanism 21 and the inspection cable insertion jig 25 are introduced into the turbine 4. The guide pipe 27 according to the present embodiment is constituted by a first guide pipe 271, a second guide pipe 272, and a fixing part 273.

The first guide pipe 271 is a pipe formed of a metal or the like in a cylindrical shape. The second guide pipe 272 is a pipe formed of the same material as the metal that forms the first guide pipe 271 and formed in a cylindrical shape, and includes a diameter smaller than that of the first guide pipe 271. The second guide pipe 272 is integrally connected to the end portion of the first guide pipe 271.

The fixing part 273 is provided on an end portion of the first guide pipe 271 opposite to the end portion connected to the second guide pipe 272. The fixing part 273 is fixed to the upper surface 260a of the guide rail 260 of the advancing/retreating actuator 26.

Here, the first guide pipe 271, the second guide pipe 272 and the fixing part 273 are formed integrally in sequence of the fixing part 273, the first guide pipe 271 and the second guide pipe 272 from a side separated from the combustor 3 in the combustor axis direction Dac when they are provided on the combustor 3.

The inspection cable guide mechanism 21 and the inspection cable insertion jig 25 are guided by the guide pipe 27 in the combustor 3. The inspection cable guide mechanism 21 is introduced into the turbine 4 after passing through the second guide pipe 272 of the guide pipe 27.

(Cooling Air Supply Part)

The cooling air supply part 28 is a device configured to supply the cooling air A3 into the gap S in the heat-resistant sheath 210 of the inspection cable guide mechanism 21 from the rear end side Dclb. For example, normal temperature air is adopted as the cooling air A3 according to the present embodiment.

(Control Device)

The control device 29 controls rotation of the rotary actuator 234 of each of the wire driving mechanisms 24 in the driving device 23, advance and retreat of the driving device 23 by the advancing/retreating actuator 26, and the like. The control device 29 is electrically connected to each of the motor main body 235a of the motor 235 provided in the rotary actuator 234, the encoder 236 provided in the rotary actuator 234, the load cell 241 provided in the pulley 238, and a servo motor installed in the advancing/retreating actuator 26.

The control device 29 determines whether or not a load received by the pulley main body 239 from the wires 22 is equal to or greater than a predetermined threshold based on a difference between load measurement values measured by the first measurement part 241a and the second measurement part 241b of the load cell 241, for example, due to deflection of the first support part 240a.

When the control device 29 determines that the load is equal to or greater than the threshold, the control device 29 decreases electric energy supplied to the motor main body 235a based on a magnitude of the load. Accordingly, since a force (torque) of rotating the spool 232 of the motor main body 235a is decreased, it is possible to reduce the magnitude of the load received by the pulley main body 239 from the wires 22.

In addition, for example, the control device 29 increases or decreases electric energy supplied to the motor main body 235a of the rotary actuator 234 in each of the wire driving mechanisms 24 based on the rotation angle of the output shaft 235b of the motor 235 detected by the encoder 236 of the rotary actuator 234 in each of the wire driving mechanisms 24. Accordingly, it is possible to adjust a position and a posture of the inspection cable guide mechanism 21.

While detailed description is omitted, the inspection cable 20b is electrically connected to the control device 29. The control device 29 supplies electric power to the sensor 20a through the inspection cable 20b. In addition, for example, the control device 29 includes a display device (not shown) configured to receive an image signal acquired by the sensor 20a through the inspection cable 20b and display an image according to the image signal.

Hereinafter, an insertion method into the turbine 4 of the inspection cable 20b and the inspection cable guide mechanism 21 using the inspection cable insertion jig 25 are described with reference to FIG. 15 to FIG. 17.

Figure 15:
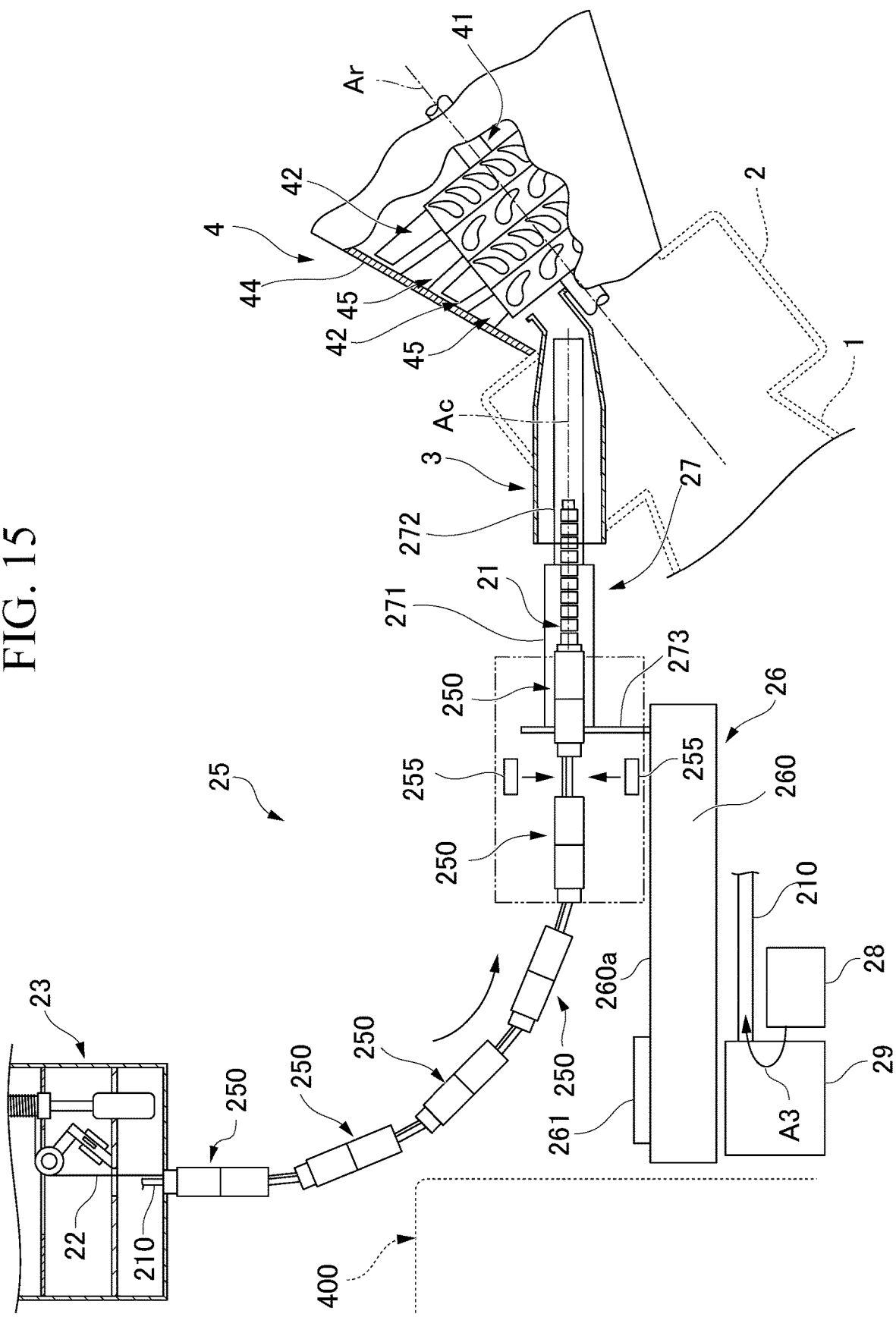
FIG. 15 is a view for describing a method of inserting an inspection cable and an inspection cable guide mechanism into a turbine using the inspection cable insertion jig according to the first embodiment of the present disclosure.

First, as shown in FIG. 15, the advancing/retreating actuator 26 is disposed in the vicinity of the inlet port of the combustor 3 to advance and retreat the driving device 23 in the combustor axis direction Dac. Next, in a state in which the guide pipe 27 is inserted through the combustor 3, the inspection cable guide mechanism 21 is inserted into the combustor 3 using the guide pipe 27. Next, the split pipes 250 are sequentially inserted into the combustor 3 using the guide pipe 27 from the split pipe 250 located on the tip side Dcla of the split pipes 250 arranged with the centerline direction Dcl of the inspection cable insertion jig 25.

Figure 16A:
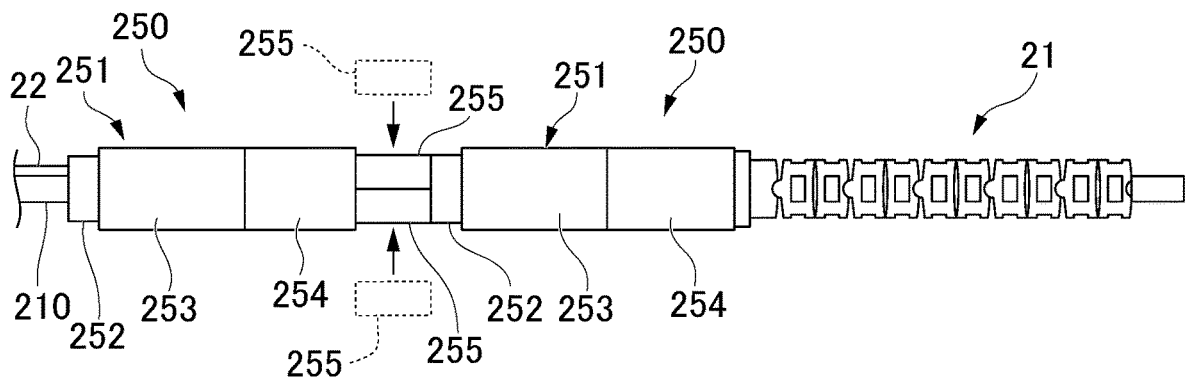
FIG. 16A is a view for describing an assembling sequence of the inspection cable insertion jig according to the first embodiment of the present disclosure.
Figure 16B:
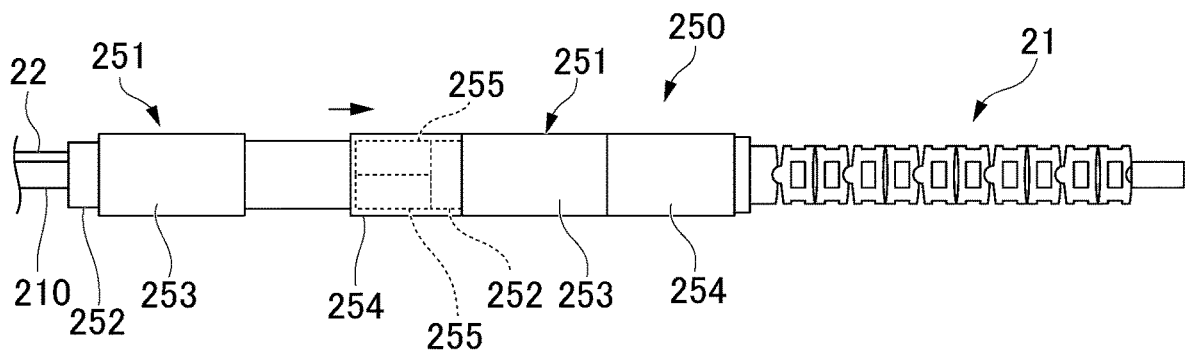
FIG. 16B is a view for describing an assembling sequence of the inspection cable insertion jig according to the first embodiment of the present disclosure.

Here, after the longitudinal directions of the split pipes 250 adjacent to each other in the centerline direction Dcl are parallel to the combustor axis Ac, as shown in FIG. 16A, the half split pipes 255 are disposed in a space generated between the adjacent split pipes 250. Next, as shown in FIG. 16B, the slide section 254 is slid in the longitudinal direction.

Figure 16C:
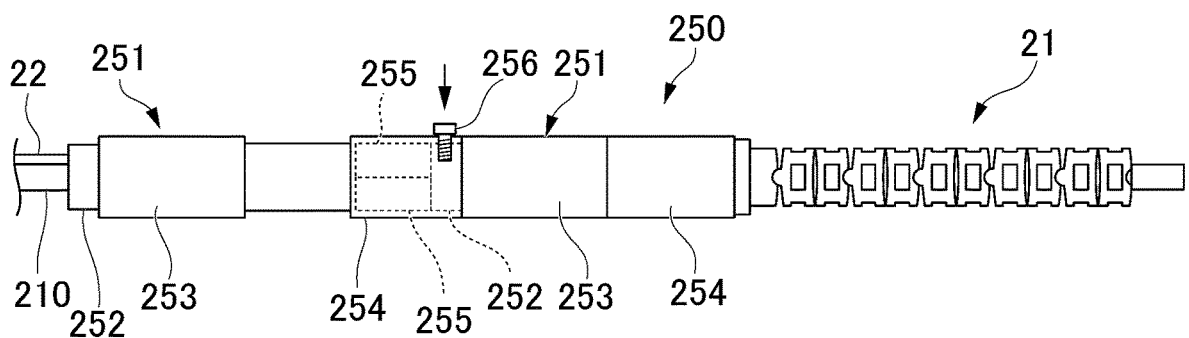
FIG. 16C is a view for describing an assembling sequence of the inspection cable insertion jig according to the first embodiment of the present disclosure.

Next, as shown in FIG. 16C, the slide section 254 and the inner tube 252 of the main body section 251 are fixed by the screw 256. After they are fixed by the screw 256, the split pipes 250 arranged on the rear end side Dclb do through a similar procedure.

Figure 17:
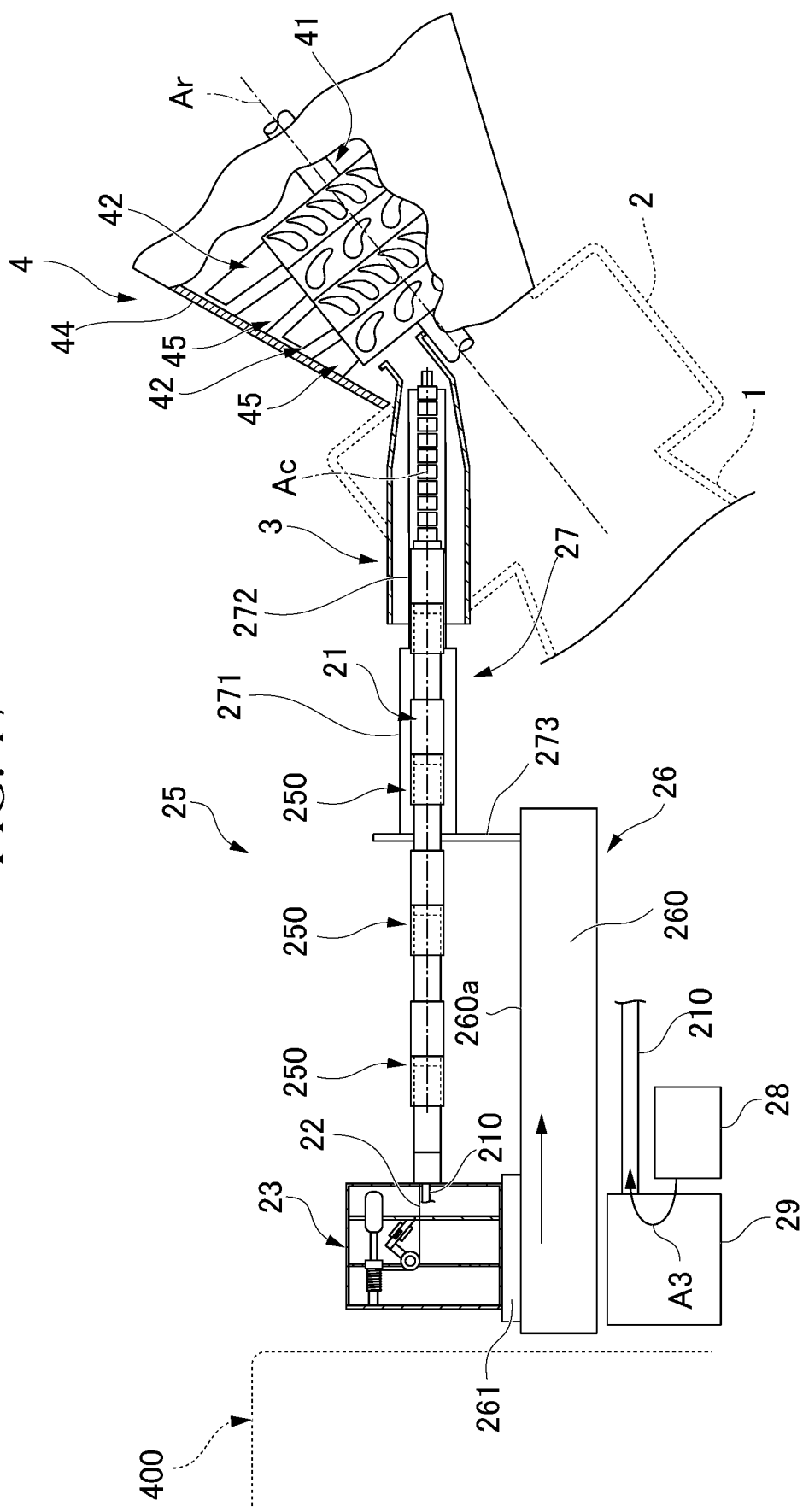
FIG. 17 is a view showing an aspect when an inspection cable and an inspection cable guide mechanism are inserted into a combustor using the inspection cable insertion jig according to the first embodiment of the present disclosure.

After inserting the inspection cable guide mechanism 21 and the inspection cable insertion jig 25 into the combustor 3, as shown in FIG. 17, the driving device 23 is placed on the advancing/retreating driving part 261 of the advancing/retreating actuator 26. Then, the inspection cable guide mechanism 21 is introduced into the turbine 4 by moving the driving device 23 in a direction approaching the combustor 3 using the advancing/retreating actuator 26.

(Effects)

Here, when the inspection object is the gas turbine 100, a temperature in the gas turbine 100 is an extremely high temperature such as about 500° C. even after shutdown. For this reason, it may take time for the temperature in the gas turbine 100 to drop to the temperature (normal temperature) that the inspection cable guide mechanism 21 can withstand.

On the other hand, in the inspection cable guide mechanism 21 of the above described embodiment, the inspection cable 20b with a tip on which the sensor 20a is provided is inserted through the heat-resistant sheath 210. Further, the cooling air A3 flows toward the tip through the gap S between the heat-resistant sheath 210 covering the inspection cable 20b from the outside and the inspection cable 20b. Accordingly, the heat-resistant sheath 210 blocks heat transmitted toward the inspection cable 20b from the outside, and the cooling air A3 blocks heat transmitted toward the inspection cable 20b through the heat-resistant sheath 210.

In addition, since the cooling air A3 can flow through the gap S to cool the heat-resistant sheath 210, it is possible to reduce the amount of heat transmitted to the inspection cable 20b from the heat-resistant sheath 210 from the outside. Accordingly, for example, when the inspection cable guide mechanism 21 guides the inspection cable 20b under a high temperature atmosphere in the turbine 4, it is possible to reduce the thermal load applied to the inspection cable 20b. As a result, it is possible to inspect the inside of the inspection object even under the high temperature environment.

In addition, the two swing axes Os that are swinging centers of one segment 212 adjacent to the two segments 212 except the segments 212 on both ends of the segments 212 of the segment stacked body 211 are perpendicular to each other when viewed in the centerline direction Dcl. Further, each of the segments 212 covers the heat-resistant sheath 210 having flexibility from the outside. Accordingly, it is possible to 3-dimensionally curve the segment stacked body 211 together with the heat-resistant sheath 210. Accordingly, for example, when the inspection cable guide mechanism 21 guides the inspection cable 20b in the turbine 4, it is possible to accurately adjust a posture of the inspection cable 20b and a position of the sensor 20a. As a result, it is possible to increase inspection accuracy of the inspection object.

In addition, in the inspection cable guide mechanism 21 of the embodiment, each of the first joint section 211a, the second joint section 211b, and the third joint section 211c of the segment stacked body 211 is constituted by ten segments 212, and one ends of the plurality of wires 22 are fixed to the segments 212 disposed on the most tip sides Dcla thereof. Accordingly, the first joint section 211a, the second joint section 211b, and the third joint section 211c can be curved in different directions by performing a pulling or pushing operation, or the like of each of the wires 22. That is, the segment stacked body 211 can be curved 3-dimensionally with the degree of freedom of the three joints. Accordingly, it is possible to more accurately adjust a posture of the inspection cable 20b and a position of the sensor 20a.

In addition, in the driving device 23 of the embodiment, the wires 22 connected to the inspection cable guide mechanism 21 are wound on the wire winding part 230 or unwound from the wire winding part 230 by rotating the wire winding part 230 in a winding direction Dwr of the wires 22 using the rotary actuator 234. Accordingly, it is possible to avoid occurrence of the space in which the wires 22 extend linearly in the driving device 23. Accordingly, the overall size of the driving device 23 can be made compact.

In addition, since the pulley main body 239 converts a direction of the wire 22 extending from the wire winding part 230 toward the inspection cable guide mechanism 21 such that the wire 22 extends along the centerline CL of the inspection cable 20b, it is possible to increase a degree of freedom in disposition of the wire winding part 230.

In addition, since the motor 235 of the rotary actuator 234 rotates the wire winding part 230 based on the rotation angle detected by the encoder 236 and the load measured by the load cell 241, it is possible to wind the wire 22 on the wire winding part 230 while maintaining a tensile force of the wire 22 extending from the inspection cable guide mechanism 21 at an appropriate magnitude. Accordingly, it is possible to prevent the segment stacked body 211 of the inspection cable guide mechanism 21 to which one end of the wire 22 is fixed from being overloaded or the wire 22 from being damaged.

In addition, when the inside of the turbine 4 as the inspection object is inspected, the inspection cable 20b and the inspection cable guide mechanism 21 are inserted into the turbine 4 through the combustor 3. Here, for example, when an intervention substance 400 constituted by a pipeline or the like is present in the vicinity of the inlet port of the combustor 3, it may be difficult to insert the inspection cable 20b and the inspection cable guide mechanism 21 into the combustor 3 in the direction in which the combustor axis Ac extends as they are.

According to the inspection cable insertion jig 25, since the neighboring split pipes 250 are provided at an interval, with the inspection cable guide mechanism 21 at the front, the entire inspection cable insertion jig 25 can be curved and routed so as to approach the inlet port front of the inspection object (the combustor 3) from diagonally above. Here, the main body section 251 of the one split pipe 250 disposed on the tip side Dcla and the slide section 254 of the split pipe 250 adjacent to the one split pipe 250 from the rear end side Dclb are assembled to be fixed, and thus, the two split pipes 250 can be inserted into the inspection object.

That is, the operation of fixing the two split pipes 250 located on the tip side Dcla to each other, and then inserting the two split pipes 250 into inspection object can be repeated. Accordingly, even when the inspection cable insertion jig 25 is formed to be long, the inspection cable 20b and the inspection cable guide mechanism 21 can be inserted into the combustor 3 without being affected by the intervention substance 400.

Second Embodiment

Figure 18:
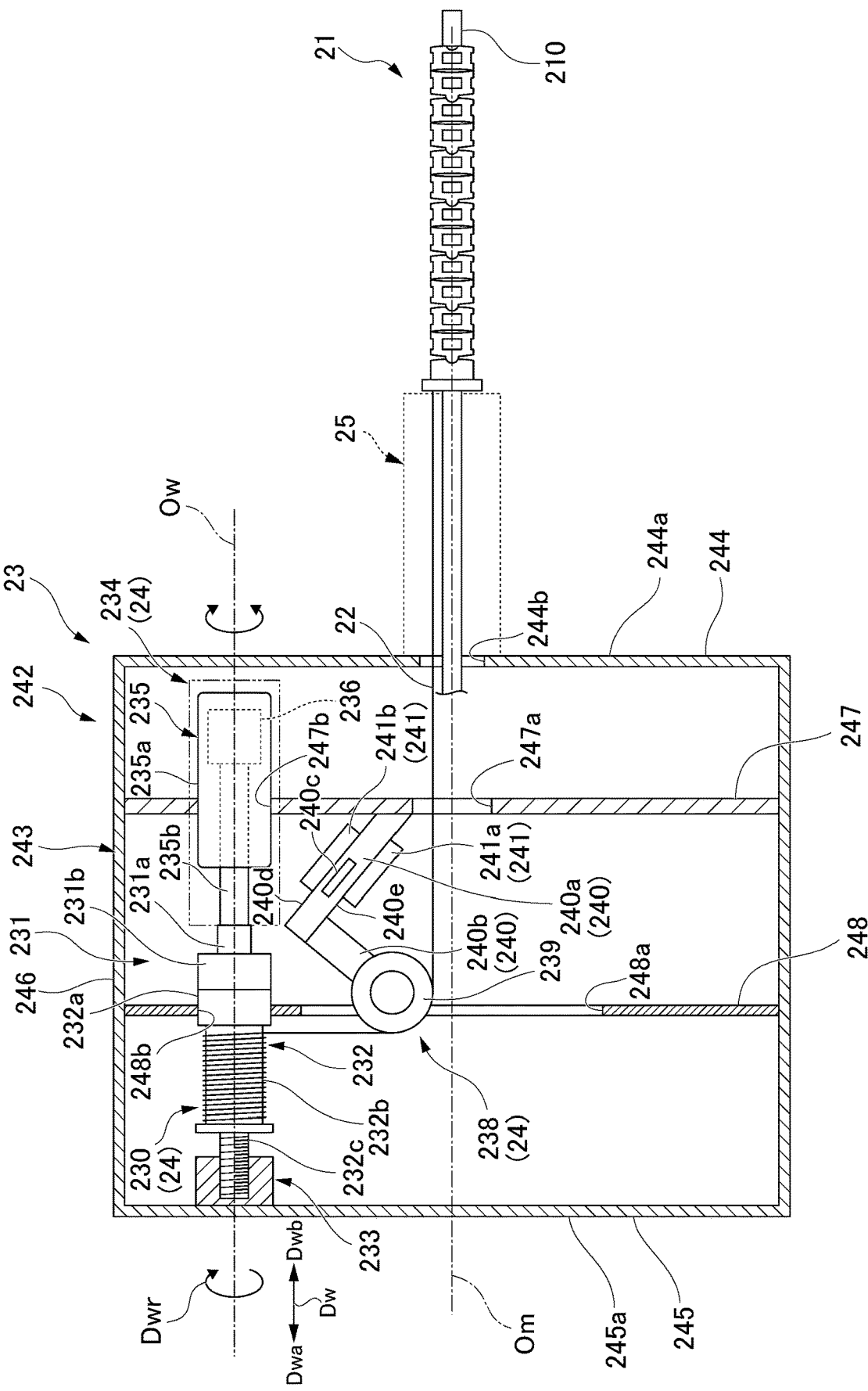
FIG. 18 is a view showing a configuration of a driving device according to a second embodiment of the present disclosure.

Hereinafter, a gas turbine inspection system according to a second embodiment of the present disclosure are described with reference to FIG. 18. A driving device of the gas turbine inspection system described in the second embodiment partially differs from the gas turbine inspection system 200 of the first embodiment in the configuration of the wire driving mechanism 24 of the driving device 23. The same components as in the first embodiment are designated by the same reference signs and detailed description thereof are omitted.

(Driving Device)

The driving device 23 is a device configured to drive the inspection cable guide mechanism 21 by pulling the wires 22 away from the tip or pushing the wires 22 toward the tip. As shown in FIG. 18, the driving device 23 includes the casing 242 and the wire driving mechanism 24. The casing 242 includes the same configuration as the first embodiment.

(Wire Driving Mechanism)

The wire driving mechanism 24 is a mechanism configured to pull the wires 22 away from the tip and push the wires 22 toward the tip. Here, the driving device 23 according to this embodiment includes nine wire driving mechanisms 24. Each of the wire driving mechanisms 24 includes the wire winding part 230, the rotary actuator 234, and the pulley 238. In FIG. 18, for the convenience of illustration, only one wire driving mechanism 24 is shown.

(Wire Winding Part)

The wire winding part 230 winds the wires 22 extending from the inspection cable guide mechanism 21. The wire winding part 230 is accommodated in the casing main body 243. The wire winding part 230 includes a spool 232, a nut 233, and a spline 231.

The spool 232 is supported by the second support plate 248 of the casing 242. The spool 232 includes a spool head portion 232a, a spool main body 232b, and a bolt portion 232c.

The spool head portion 232a forms a cylindrical shape extending about the axis line thereof, and is inserted through the second support hole 248b formed in the second support plate 248. The spool head portion 232a is rotatably supported by the second support holes 248b. The spool main body 232b is a member connected to the spool head portion 232a from one side Dwa and forming a cylindrical shape extending about the winding axis Ow (the axis line) parallel to the center axis Om.

The spool main body 232b includes a spiral groove that forms a spiral in the winding axis direction Dw about the winding axis Ow. The wires 22 extending from the inspection cable guide mechanism 21 through the insertion hole 244b, the first hole 247a, and the second hole 248a are wound on the spool main body 232b along the spiral groove. The other end of the wire 22 is fixed to the spool main body 232b. The bolt portion 232c is a male screw extending from the spool main body 232b toward the one side Dwa (the side of the second end plate 245) about the winding axis Ow.

The bolt portion 232c of the spool 232 is threaded into the nut 233 while the nut 233 is fixed to the second end plate 245. A pitch of the nut 233 (a pitch of the bolt portion 232c) has the same dimension as that of the spiral groove.

The spline 231 is connected to the spool head portion 232a of the spool 232 from the other side Dwb (the side of the first end plate 244). The spline 231 includes a spline main body 231a and a spline shaft 231b.

The spline main body 231a is a member that forms a cylindrical shape extending about the winding axis Ow, and is fixed to the spool head portion 232a from the other side Dwb. The spline main body 231a includes an internal tooth (not shown).

The spline shaft 231b is a member that forms a columnar shape extending about the winding axis Ow, and protrudes integrally from the spline main body 231a toward the other side Dwb. The spline shaft 231b includes an external tooth (not shown) fitted into an internal tooth of the spline main body 231a.

(Rotary Actuator)

The rotary actuator 234 is a device connected to the wire winding part 230 and configured to rotate the wire winding part 230. The rotary actuator 234 includes the motor 235 and the encoder 236.

The motor 235 includes the motor main body 235a constituted by a stator or the like (not shown), and the output shaft 235b to which a rotator or the like (not shown) is fixed and protruding from the motor main body 235a toward one side Dwa.

The motor main body 235a is inserted through the first support holes 247b formed in the first support plate 247 and supported by the first support holes 247b. A cable or the like (not shown) configured to supply electric power from the outside is connected to the stator of the motor main body 235a.

The output shaft 235b is provided on the motor main body 235a, and includes an end portion protruding from the motor main body 235a toward one side Dwa. The spline shaft 231b of the spline 231 is connected to the end portion of the output shaft 235b. In other words, the output shaft 235b of the motor 235 is connected to the spline shaft 231b of the spline 231 from the other side Dwb.

Accordingly, the output shaft 235b is rotated by supplying electric power to the motor main body 235a from the outside. According to the rotation of the output shaft 235b, the torque is transmitted to the spline 231 and the spool 232 connected to the spline 231 from one side Dwa, and the spool 232 is rotated. Here, the spool 232 can advance and retreat with respect to the nut 233 fixed to the second end plate 245 together with the spline main body 231a of the spline 231 in the winding axis direction Dw.

The encoder 236 is a device configured to detect a rotation angle of the output shaft 235b in the motor main body 235a and transmit a detection result to an external device.

(Pulley)

The pulley 238 includes the same configuration as the first embodiment.

(Effects)

In the driving device 23 of the embodiment, a pitch of the spiral groove provided in the spool 232 of the wire winding part 230 includes the same dimension as that of the nut 233, and the spool 232 can advance and retreat with respect to the nut 233 together with the spline 231 according to the rotation of the motor 235 while being threaded into the nut 233.

Accordingly, when the wires 22 are wound on the spool 232 or the wires 22 are unwound from the spool 232 according to the rotation of the motor 235, a winding position and an unwinding position of the wires 22 in the spool 232 can be maintained at a fixed position.

Accordingly, it is possible to suppress occurrence of sliding friction between the spool 232 and the wires 22. As a result, the spool 232 can wind or unwind the wires 22 smoothly.

Third Embodiment

Hereinafter, a gas turbine inspection system according to a third embodiment of the present disclosure are described with reference to FIG. 19 and FIG. 20. The gas turbine inspection system described in the second embodiment partially differs from the gas turbine inspection system 200 of the first embodiment in the configuration of the inspection cable insertion jig. The same components as in the first embodiment are designated by the same reference signs and detailed description thereof are omitted.

(Inspection Cable Insertion Jig)

Figure 19:
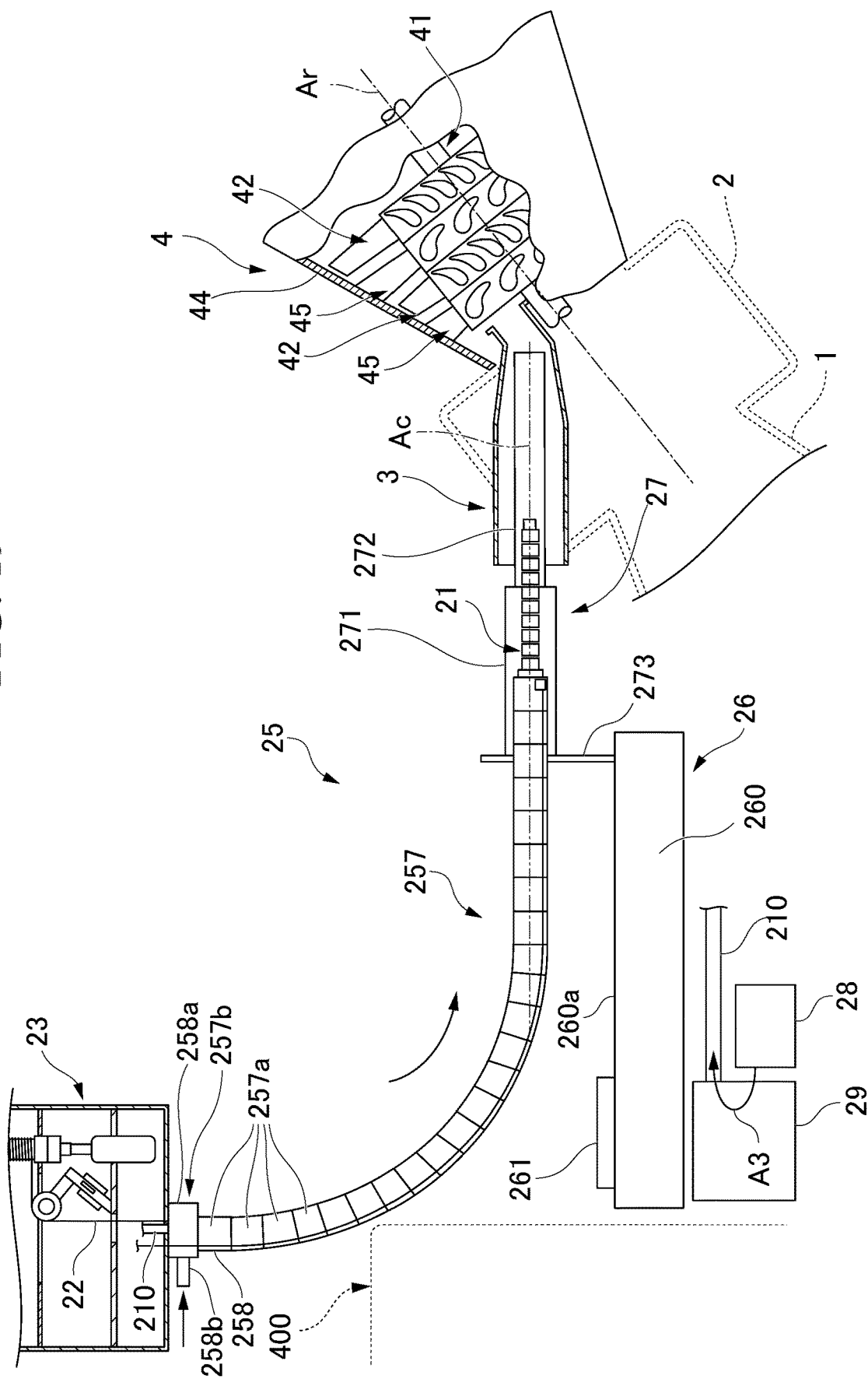
FIG. 19 is a view for describing a configuration of an inspection cable insertion jig according to a third embodiment of the present disclosure, and describing a method of inserting an inspection cable and an inspection cable guide mechanism into a turbine using the inspection cable insertion jig.

As shown in FIG. 19, the inspection cable insertion jig 25 according to the present embodiment includes a cable accommodating body 257 and a bending prevention member 258.

The inspection cable 20b and the wires 22 can be inserted through the cable accommodating body 257. The cable accommodating body 257 includes a plurality of split bodies 257a connected in a direction in which the centerline CL of the inspection cable 20b extends, and a cable fixing part 257b connected to a split body 257a located on the most rear end side Dclb from the rear end side Dclb.

The cable accommodating body 257 is configured to be bendable in only one direction. The split body 257a and the cable fixing part 257b are formed of a metal or the like, and have cable insertion holes (not shown) through which the bending prevention member 258 can be inserted.

The bending prevention member 258 is provided on the cable accommodating body 257 from a side opposite to a direction in which the cable accommodating body 257 is bendable. Specifically, the bending prevention member 258 is inserted through the cable insertion holes of the split body 257a and the cable fixing part 257b along a center axis CL, and extends from the cable fixing part 257b toward the rear end side Dclb. The bending prevention member 258 is formed of a metal or the like.

Here, the cable fixing part 257b includes a fixing part main body 258a, and a cable locking portion 258b configured to fix the bending prevention member 258 inserted through the cable insertion hole to the fixing part main body 258a.

Specifically, the cable locking portion 258b sandwiches (grips) the bending prevention member 258 between the cable locking portion 258b and the fixing part main body 258a by being pressed from the outside. Accordingly, the bending prevention member 258 inserted through the split bodies 257a is immovably fixed to the cable fixing part 257b, and as a result, the bending of the cable accommodating body 257 can be regulated.

Further, a caulking portion with a diameter greater than that of the cable insertion hole is formed on the end portion of the bending prevention member 258 on the tip side Dcla. The caulking portion does not cause the bending prevention member 258 to come off the split body 257a located on the most tip side Dcla.

Hereinafter, an insertion method of the inspection cable 20b, and the inspection cable guide mechanism 21 into the turbine 4 using the inspection cable insertion jig 25 are described.

First, as shown in FIG. 19, the advancing/retreating actuator 26 is installed in the vicinity of the inlet port of the combustor 3 to advance and retreat the driving device 23 in the combustor axis direction Dac. Next, the inspection cable guide mechanism 21 is inserted into the combustor 3 using the guide pipe 27 in a state in which the guide pipe 27 is inserted through the combustor 3. Next, in a state in which the cable locking portion 258b included in the cable fixing part 257b is pressed while the cable accommodating body 257 of the inspection cable insertion jig 25 is curved in one direction, the split bodies 257a are sequentially inserted into the combustor 3 from the split body 257a located on the tip side Dcla using the guide pipe 27.

After one or the plurality of split bodies 257a are inserted into the guide pipe 27, pressing of the cable locking portion 258b is appropriately released and the cable accommodating body 257 is curved in one direction again, split bodies 257a are inserted into the combustor 3 using the guide pipe 27 sequentially from the split body 257a located on the tip side Dcla not inserted into the guide pipe 27 in a state in which the cable locking portion 258b is pressed.

Figure 20:
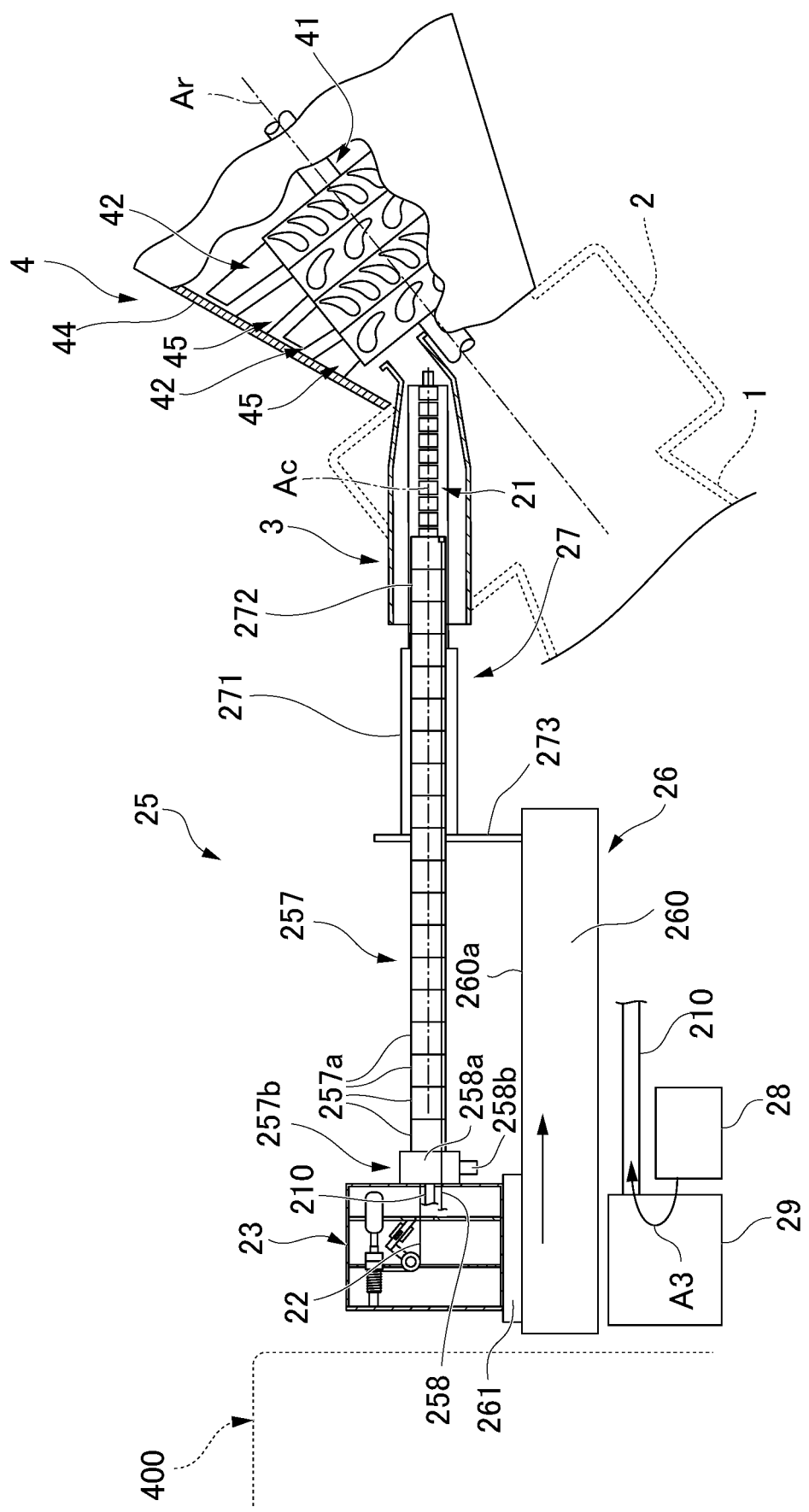
FIG. 20 is a view showing an aspect when the inspection cable and the inspection cable guide mechanism are inserted into the combustor using the inspection cable insertion jig according to the third embodiment of the present disclosure.

After insertion of the inspection cable guide mechanism 21 and the inspection cable insertion jig 25, as shown in FIG. 20, the driving device 23 is placed on the advancing/retreating driving part 261 of the advancing/retreating actuator 26. Then, when the advancing/retreating actuator 26 moves the driving device 23 in a direction approaching the combustor 3, the inspection cable guide mechanism 21 is introduced into the turbine 4.

(Effects)

By using the inspection cable insertion jig 25 of the above described embodiment, with the inspection cable guide mechanism 21 at the front, the entire inspection cable insertion jig 25 can be bent and routed such that it approaches the inlet port front of the inspection object (the combustor 3) obliquely from above. In addition, in comparison with the inspection cable insertion jig 25 according to the first embodiment, the inspection cable 20b and the inspection cable guide mechanism 21 can be inserted into the combustor 3 more easily.

Other Embodiments

Hereinabove, while the embodiments of the present disclosure are described in detail with reference to the accompanying drawings, a specific configuration is not limited to the configuration of the embodiment, and additions, omissions, substitutions and other modifications may be made without departing from the scope of the present disclosure. In addition, the present disclosure is not limited to the embodiment but limited by the claims.

Further, the sensor 20a is not limited to a sensor module in which a semiconductor element of a CCD image sensor or a CMOS image sensor is incorporated, or may be a fiber scope or the like.

Figure 21:
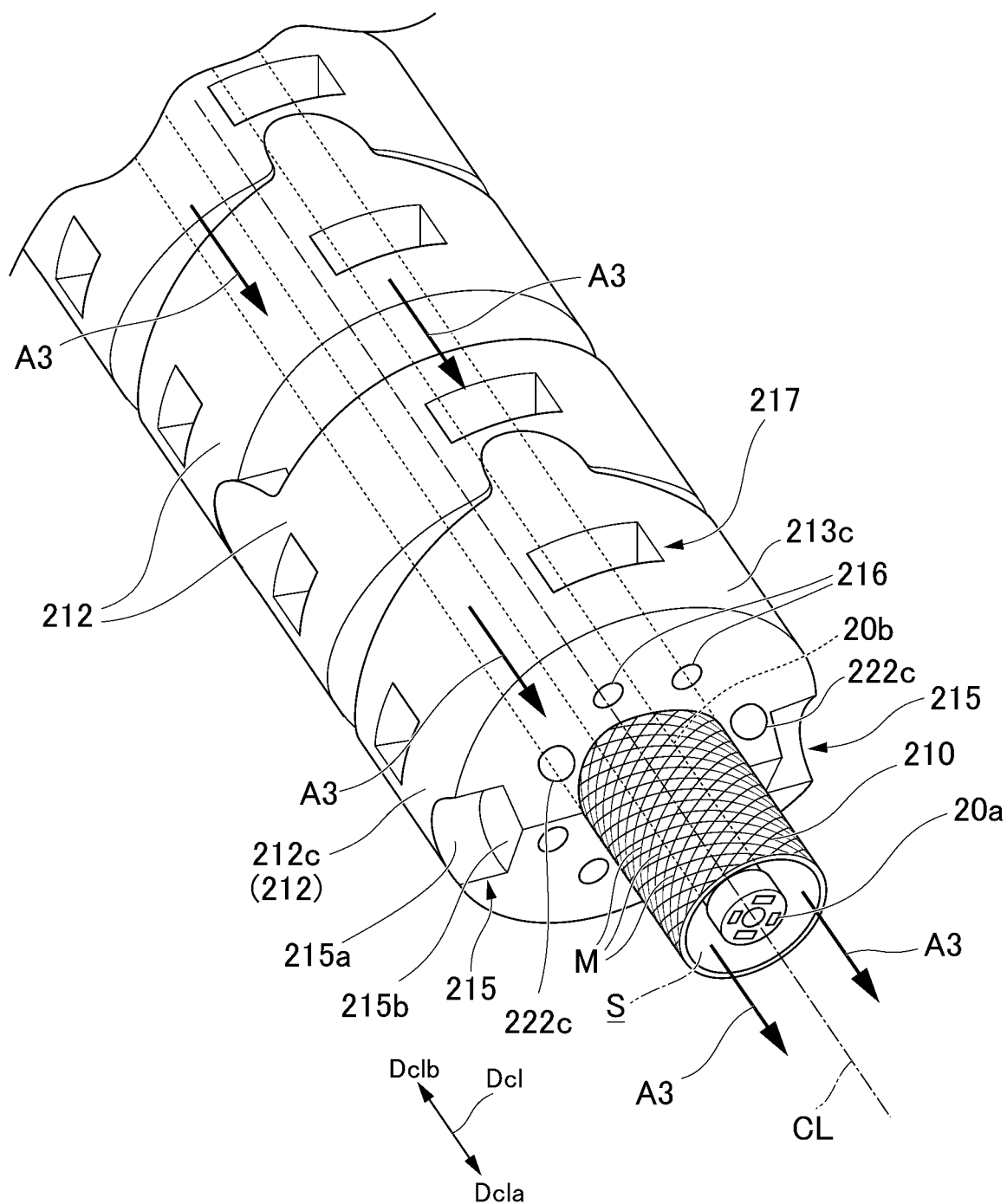
FIG. 21 is a view showing a heat-resistant sheath according to another embodiment of the present disclosure.

In addition, a material that forms the heat-resistant sheath 210 is not limited to a synthetic resin. For example, as shown in FIG. 21, the heat-resistant sheath 210 may adopt a material in which a synthetic resin is embedded in a metal mesh (blade) formed by weaving a plurality of metal lines M.

In addition, the number of the segments 212 that constitute the segment stacked body 211 is not limited to the above described number. The number of the segments 212 that constitute the segment stacked body 211 may be three or more.

Figure 22:
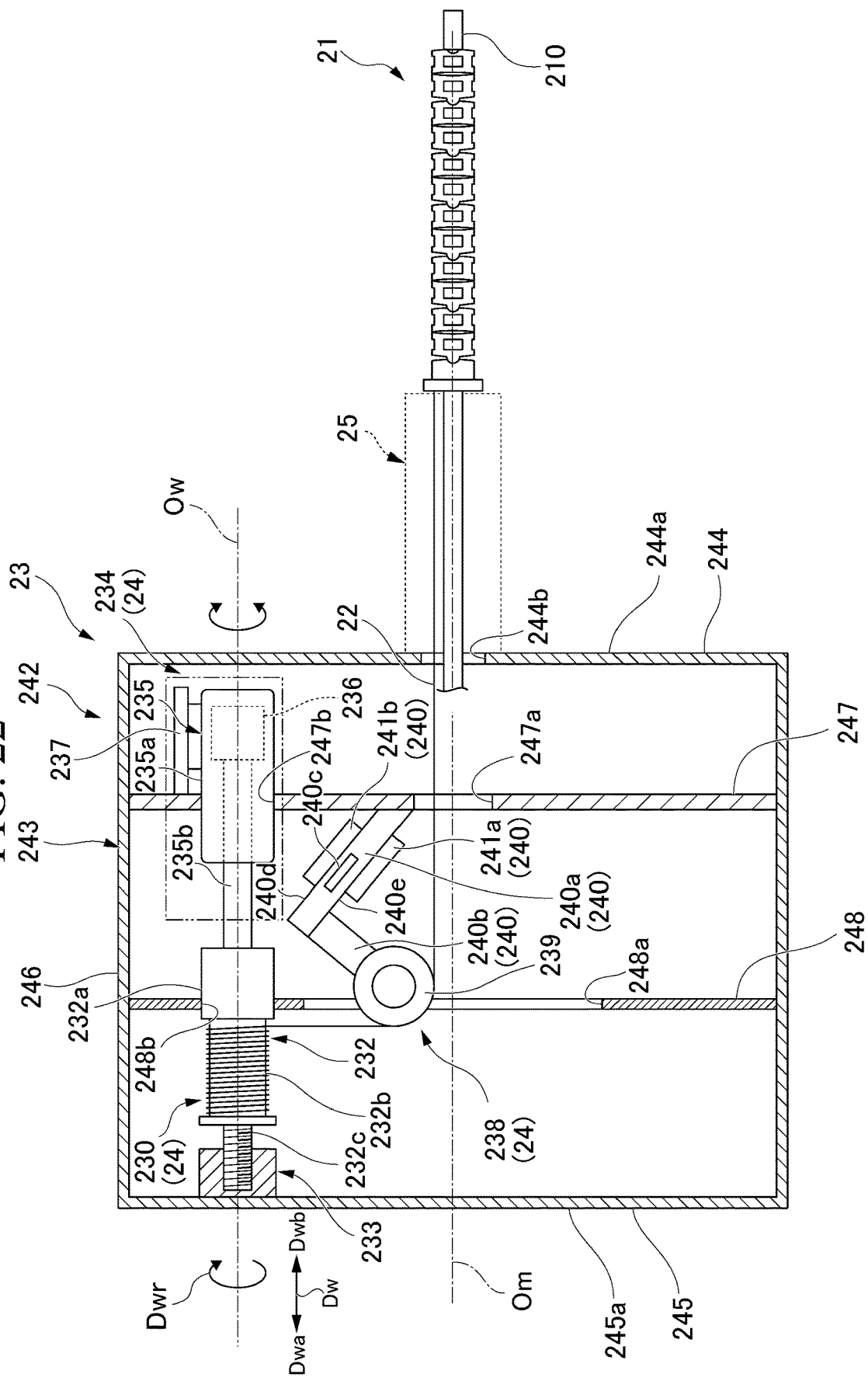
FIG. 22 is a view showing a configuration of a driving device according to another embodiment of the present disclosure.

In addition, the configuration of the wire winding part 230 and the rotary actuator 234 provided in the wire driving mechanism 24 of the driving device 23 is not limited to the above described embodiments. For example, as shown in FIG. 22, a configuration in which the wire winding part 230 does not include the spline 231 and the rotary actuator 234 further includes a linear guide 237 may be used.

In this case, the motor main body 235a is a member supported in the first support holes 247b to be movable in the winding axis direction Dw and configured to fix the linear guide 237 to the first support plate 247 and guide the motor 235 in the winding axis direction Dw. Accordingly, the motor 235 and the spool 232 of the rotary actuator 234 can advance and retreat with respect to the nut 233 in the winding axis direction Dw.

In addition, as shown in FIG. 23, the plurality of driving devices 23 may be disposed linearly. Accordingly, the number of joint sections provided in the segment stacked body 211 can be increased. In FIG. 23, the case in which three of the driving devices 23 are arranged in series is exemplified.

In this case, a hole 245b through which the wires 22 can be inserted is formed in the center of the second end plate 245 of the casing 242 in the two driving devices 23 counting from the tip side Dcla (a right side in FIG. 23).

Further, the inspection cable guide mechanism 21 includes nine joint sections (a first joint section 211a, a second joint section 211b, a third joint section 211c, a fourth joint section 211d, a fifth joint section 211e, a sixth joint section 211f, a seventh joint section 211g, an eighth joint section 211h, and a ninth joint section 211i), for example, each having ten segments 212.

In addition, the main body section 251 of the split pipes 250 is not limited to a configuration including the inner tube 252 and the outer tube 253. For example, the main body section 251 may be a member that forms one cylindrical shape. Here, the slide section 254 may be configured to form a cylindrical shape with a diameter greater than that of the main body section 251 that covers the main body section 251 from the outside and to be slidable with respect to the main body section 251 in the longitudinal direction.

Supplementary Statements

The inspection cable guide mechanism, the driving device, the inspection cable insertion jig, and the gas turbine inspection system disclosed in each of the embodiments are ascertained as follows, for example.

(1) The inspection cable guide mechanism 21 according to a first aspect includes the heat-resistant sheath 210 having flexibility through which the inspection cable 20b with the sensor 20a provided on the tip is allowed to be inserted and the cooling air A3 is allowed to flow through the gap S between the heat-resistant sheath 210 and the inspection cable 20b therein toward the tip, the segment stacked body 211 configured by stacking three or more segments 212 having heat resistance and covers the heat-resistant sheath 210 from the outside in the direction in which the centerline CL of the inspection cable 20b extends, and the plurality of wires 22 disposed around the heat-resistant sheath 210 and extending along the centerline CL, the one segment 212 of the segments 212 other than the segments 212 on both ends in the segment stacked body 211 is swingable with respect to the two segments 212 adjacent to the one segment 212 in the centerline direction Dcl about the swing axes Os extending in the direction perpendicular to the centerline CL, the two swing axes Os that become centers when the one segment 212 swings with respect to the two segments 212 are perpendicular to each other when seen in the centerline direction Dcl, and one end of each of the wires 22 is fixed to one of the segments 212 in the segment stacked body 211.

Accordingly, the heat-resistant sheath 210 can block heat transmitted to the inspection cable 20b from the outside, and the cooling air A3 can block heat transmitted toward the inspection cable 20b through the heat-resistant sheath 210.

(2) The inspection cable guide mechanism 21 according to a second aspect is the inspection cable guide mechanism 21, the segment stacked body 211 may include the first joint section 211a, the second joint section 211b and the third joint section 211c, each of the first joint section 211a, the second joint section 211b and the third joint section 211c is constituted by the plurality of segments 212, the first joint section 211a, the second joint section 211b and the third joint section 211c may be arranged in the centerline direction Dcl from a side opposite to the tip in sequence of the first joint section 211a, the second joint section 211b and the third joint section 211c, and the plurality of wires 22 may be constituted by the plurality of first jointing wires 22a with one ends fixed to the segment 212 disposed on the most tip side Dcla of a side of the tip in the first joint section 211a, the plurality of second jointing wires 22b with one ends fixed to the segment 212 disposed on the most tip side Dcla in the second joint section 211b, and the plurality of third jointing wires 22c with one ends fixed to the segment 212 disposed on the most tip side Dcla in the third joint section 211c.

Accordingly, the first joint section 211a, the second joint section 211b and the third joint section 211c can be curved in different directions by performing a pulling or pushing operation or the like with respect to each of the wires 22.

(3) The driving device 23 according to a third aspect is the driving device 23 configured to drive the inspection cable guide mechanism 21 of the above-mentioned (1) or (2) by pulling the wires 22 away from the tip or pushing the wires 22 toward the tip, the driving device including the wire winding part 230 on which the wires 22 are wound, the rotary actuator 234 having the motor 235 connected to the wire winding part 230 and configured to rotate the wire winding part 230 about the axis line in the winding direction Dwr of the wires 22, the pulley 238 having the pulley main body 239 configured to convert a direction of the wires 22 extending from the wire winding part 230 toward the segment stacked body 211 such that the wire extends along the centerline CL in the midway and the support part 240 configured to support the pulley main body 239, and the casing 242 configured to accommodate and support the wire winding part 230, the rotary actuator 234 and the pulley 238.

Accordingly, the wires 22 connected to the inspection cable guide mechanism 21 can be wound or unwound by rotating the wire winding part 230 in the winding direction Dwr of the wires 22 using the rotary actuator 234. In addition, since the pulley main body 239 converts the direction of the wires 22 to along the centerline CL, a degree of freedom in disposition of the wire winding part 230 can be increased.

(4) The driving device 23 according to a fourth aspect is the driving device 23 of the above-mentioned (3), the rotary actuator 234 may further include the encoder 236 configured to detect a rotation angle of the motor 235, the pulley 238 may further include the load cell 241 provided on the support part 240, and the motor 235 may rotate the wire winding part 230 based on the rotation angle detected by the encoder 236 and the load applied to the support part 240 measured by the load cell 241.

Accordingly, it is possible to wind the wires 22 on the wire winding part 230 while maintaining a tensile force of the wires 22 extending from the inspection cable guide mechanism 21 at an appropriate magnitude.

(5) The driving device 23 according to a fifth aspect is the driving device 23 of the above-mentioned (3) or (4), the wire winding part 230 may include the spline 231 connected to the motor 235 from one side Dwa in an axis direction along the axis line, the spool 232 connected to the spline 231 from the one side Dwa in the axis direction and having a spiral groove on which the wire 22 is wound, and the nut 233 into which the spool is threaded toward the one side Dwa in the axis direction and which is fixed to the casing 242, a pitch of the spiral groove of the spool 232 may have the same dimension as that of the nut 233, and the spool 232 may be allowed to advance and retreat in the axis direction with respect to the nut 233 together with the spline 231 according to rotation of the motor 235 while being threaded into the nut 233.

Accordingly, when the wires 22 are wound on the spool 232 or when the wires 22 are unwound from the spool 232, it is possible to maintain a winding position and an pushing position of the wires 22 in the spool 232 at fixed positions.

(6) The driving device 23 according to a sixth aspect is the driving device 23 according to the above-mentioned (3) or (4), the rotary actuator 234 may further include the linear guide 237 configured to guide the motor 235 in the axis direction, the wire winding part 230 may include the spool 232 connected to the motor 235 from the one side Dwa in the axis direction and having a spiral groove in which the wires 22 are wound, and the nut 233 into which the spool 232 is threaded toward the one side Dwa in the axis direction and which is fixed to the casing 242, a pitch of the spiral groove of the spool 232 may have the same dimension as that of the nut 233, and the spool 232 may be allowed to advance and retreat in the axis direction with respect to the nut 233 together with the motor 235 according to the rotation of the motor 235 while being threaded into the nut 233.

(7) The driving device 23 according to a seventh aspect is the driving device 23 configured to drive the inspection cable guide mechanism 21 by pulling the wires 22 extending from the inspection cable guide mechanism 21 configured to guide the inspection cable 20b with the tip on which the sensor 20a is provided away from the tip side Dcla of a side of the tip and pushing the wires 22 toward the tip side Dcla, the driving device 23 including the wire winding part 230 on which the wires 22 are wound, the rotary actuator 234 having the motor 235 connected to the wire winding part 230 and configured to rotate the wire winding part 230 in the winding direction Dwr of the wires 22, the pulley 238 having the pulley main body 239 configured to convert a direction of the wires 22 extending from the wire winding part 230 toward the inspection cable guide mechanism 21 in the midway and the support part 240 configured to support the pulley main body 239, and the casing 242 configured to accommodate and support the wire winding part 230, the rotary actuator 234 and the pulley 238.

(8) The inspection cable insertion jig 25 according to an eighth aspect is the inspection cable insertion jig 25 connected to the inspection cable guide mechanism 21 of the above-mentioned (1) or (2) from the side opposite to the tip and inserted into the inspection object together with the inspection cable guide mechanism 21, the inspection cable insertion jig 25 including the plurality of split pipes 250 having the main body sections 251 forming a cylindrical shape, configured to cover the heat-resistant sheath 210 and the wires 22 from the outside and aligned with the centerline direction Dcl at an interval, and the slide sections 254 forming a cylindrical shape, surrounding the main body section 251 from the outer circumferential side thereof and provided on the main body section 251 to be slidable in the centerline direction Dcl, the plurality of half split pipes 255 forming a half-cylindrical shape and disposed between the neighboring main body sections 251 to fill the space in which the neighboring main body sections 251 are formed at the interval, and the screw 256 configured to fix the slide section 254 of the split pipe 250 to the main body sections 251 adjacent to the one split pipe 250 of the plurality of split pipes 250 in the centerline direction Dcl when the slide section 254 of the one split pipe 250 slides in the centerline direction Dcl and covers the half split pipe 255 from the outside.

Accordingly, it is possible to repeat the operation of handling the inspection cable guide mechanism 21 and the inspection cable insertion jig 25 to approach the front surface of the inlet port of the inspection object from above obliquely and inserting the two split pipes 250 into the inspection object after fixing the two split pipes 250 located on the tip side Dcla to each other.

(9) The inspection cable insertion jig 25 according to a ninth aspect is the inspection cable insertion jig 25 connected to the inspection cable guide mechanism 21 according to the above-mentioned (1) or (2) from the side opposite to the tip and inserted into the inspection object together with the inspection cable guide mechanism 21, the inspection cable insertion jig 25 including the cable accommodating body 257 through which the heat-resistant sheath 210 is allowed to be inserted, including the plurality of split bodies 257a connected to each other along the centerline CL and bendable on only one direction, and the bending prevention member 258 provided on the cable accommodating body 257 along the centerline CL and configured to prevent bending of the cable accommodating body 257 when being fixed to the cable accommodating body 257.

Accordingly, it is possible to insert the inspection cable 20b and the inspection cable guide mechanism 21 into the inspection object from, for example, above obliquely even when an intervention substance is present in the vicinity of the inlet port of the inspection object.

(10) The inspection cable insertion jig 25 according to a tenth aspect is the inspection cable insertion jig 25 connected to the inspection cable guide mechanism 21 configured to guide the inspection cable 20b with the tip on which the sensor 20a is provided from a side opposite to the tip and inserted into the inspection object together with the inspection cable guide mechanism 21, the inspection cable insertion jig 25 including the plurality of split pipes 250 having the main body sections 251 forming a cylindrical shape, covering the inspection cable 20b from the outside and arranged at intervals in the direction in which the centerline CL of the inspection cable 20b extends, and the slide sections 254 forming a cylindrical shape, surrounding the main body sections 251 from the outer circumferential side and provided on the main body sections 251 slidably in the centerline direction Dcl, the plurality of half split pipes 255 forming a half-cylindrical shape and disposed between the neighboring main body sections 251 to fill the space in which the neighboring main body sections 251 are formed at the interval, and the a screw 256 configured to fix the slide section 254 to the main body section 251 of the split pipe 250 adjacent to the one split pipe 250 of the plurality of split pipes 250 in the centerline direction Dcl when the slide section 254 of the one split pipe 250 slides in the centerline direction Dcl and covers the half split pipe 255 from the outside.

(11) The inspection cable insertion jig 25 according to an eleventh aspect is the inspection cable insertion jig 25 connected to the inspection cable guide mechanism 21 configured to guide the inspection cable 20b with the tip on which the sensor 20a is provided from a side opposite to the tip and inserted into the inspection object together with the inspection cable guide mechanism 21, the inspection cable insertion jig 25 including the cable accommodating body 257 through which the inspection cable 20b is allowed to be inserted, including the plurality of split bodies 257a connected to each other in the direction in which the centerline CL of the inspection cable 20b extends and bendable in only one direction, and the bending prevention member 258 provided on the cable accommodating body 257 along the centerline CL and configured to prevent bending of the cable accommodating body 257 when being fixed to the cable accommodating body 257.

(12) The gas turbine inspection system 200 according to a twelfth aspect is the gas turbine inspection system 200 configured to inspect the inside of the gas turbine 100 as the inspection object, the gas turbine inspection system 200 including the sensor 20a and the inspection cable 20b, the inspection cable guide mechanism 21 according to the above-mentioned (1) or (2) inserted into the turbine 4 following the combustor 3 of the gas turbine 100 through the combustor 3 and configured to guide the inspection cable 20b in the turbine 4, the driving device 23 according to any one of the above-mentioned (3) to (6) disposed outside the gas turbine 100, the inspection cable insertion jig 25 according to the above-mentioned (8) or (9), the advancing/retreating actuator 26 configured to advance and retreat the driving device 23 toward or away from the combustor 3, the cooling air supply part 28 configured to supply the cooling air A3 into the gap S in the heat-resistant sheath 210 from the side opposite to the tip, and the control device 29 configured to control rotation of the rotary actuator 234 and advance/retreat of the driving device 23 by the advancing/retreating actuator 26.

According to the present disclosure, it is possible to provide the inspection cable guide mechanism, the driving device, the inspection cable insertion jig, and the gas turbine inspection system that are allowed to inspect the inside of the inspection object even under a high temperature environment.

While preferred embodiments of the invention are described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Compressor
2 Intermediate casing
3 Combustor
4 Turbine
10 Compressor rotor
11 Compressor rotor shaft
12 Compressor rotor vane cascade
13 Compressor casing
14 Compressor casing main body
15 Air inlet part
16 Compressor stator vane row
20a Sensor
20b Inspection cable
21 Inspection cable guide mechanism
22 Wire
22a First jointing wire
22b Second jointing wire
22c Third jointing wire
22d Fourth jointing wire
22e Fifth jointing wire
22f Sixth jointing wire
22g Seventh jointing wire
22h Eighth jointing wire
22i Ninth jointing wire
23 Driving device
24 Wire driving mechanism
25 Inspection cable insertion jig
26 Advancing/retreating actuator
27 Guide pipe
28 Cooling air supply part
29 Control device
40 Turbine rotor
41 Turbine rotor shaft
42 Turbine rotor vane cascade
43 Turbine casing
44 Turbine casing main body
45 Turbine stator vane row
100 Gas turbine
101 Gas turbine casing
102 Gas turbine rotor
200 Gas turbine inspection system
210 Heat-resistant sheath
211 Segment stacked body
211a First joint section
211b Second joint section
211c Third joint section
211d Fourth joint section
211e Fifth joint section
211f Sixth joint section
211g Seventh joint section
211h Eighth joint section
211i Ninth joint section
211j Connecting section
212 Segment
212a First segment
212b Second segment
212c Third segment
213 Segment main body
213a Tip surface
213b Rear end surface
213c Outer circumferential surface
214 Through-hole
215 Recessed portion
215a Recessed surface
215b Recessed portion abutting surface
216 Wire insertion hole
216a First wire insertion hole
216b Second wire insertion hole
216c Third wire insertion hole
217 Weight-reducing hole
218 Protruding portion
218a Protruding surface
218b Protruding portion outer surface
218c Protruding portion abutting surface
222a, 222b, 222c Caulking ball
230 Wire winding part
231 Spline
231a Spline main body
231b Spline shaft
232 Spool
232a Spool head portion
232b Spool main body
232c Bolt portion
233 Nut
234 Rotary actuator
235 Motor
235a Motor main body
235b Output shaft
236 Encoder
237 Linear guide
238 Pulley
239 Pulley main body
240 Support part
240a First support part
240b Second support part 240c Support part hole
240d First surface
240e Second surface
241 Load cell
241a First measurement part
241b Second measurement part
242 Casing
243 Casing main body
244 First end plate
244a Front surface
244b Insertion hole
245 Second end plate
245a Back surface
245b Hole
246 Connecting plate
247 First support plate
247a First hole
247b First support hole
248 Second support plate
248a Second hole
248b Second support hole
250 Split pipes
251 Main body section
252 Inner tube
253 Outer tube
254 Slide section
255 Half split pipes
256 Screw
257 Cable accommodating body
257a Split body
257b Cable fixing part
258 Bending prevention member
258a Fixing part main body
258b Cable locking portion
260 Guide rail
260a Upper surface
261 Advancing/retreating driving part
271 First guide pipe
272 Second guide pipe
273 Fixing part
300 Generator
301 Generator output shaft
400 Intervention substance
A1 Air
A2 Compressed air
A3 Cooling air
Ac Combustor axis
Ar Rotor axis
Cg Combustion gas flow channel
CL Centerline
Da Rotor axis direction
Dac Combustor axis direction
Dad Axis downstream side
Dau Axis upstream side
Dcl Centerline direction
Dcla Tip side
Dclb Rear end side
Dr Radial direction
Dri Inner side in radial direction
Dro Outer side in radial direction
Dw Winding axis direction
Dwa One side
Dwb The other side
Dwr Winding direction
Ea Tip
Eb Rear end
F Fuel
G Combustion gas
M Metal line
Om Center axis
Os Swing axis
Ow Winding axis
S Gap

What is claimed is:

1. An inspection cable guide mechanism comprising:
a heat-resistant sheath having flexibility through which an inspection cable with a tip on which a sensor is provided is allowed to be inserted and cooling air is allowed to flow toward the tip through a gap between the heat-resistant sheath and the inspection cable therein;
a segment stacked body configured by stacking three or more segments having heat resistance and covering the heat-resistant sheath from the outside in a direction in which a centerline of the inspection cable extends; and
a plurality of wires disposed around the heat-resistant sheath and extending along the centerline,
wherein one segment among the segments other than segments of the segments on both ends in the segment stacked body is swingable with respect to two segments adjacent to the one segment in the centerline direction about swing axes extending in a direction perpendicular to the centerline,
the two swing axes that become centers when the one segment swings with respect to the two segments are perpendicular to each other when viewed in the centerline direction, and
one end of each of the wires is fixed to one of the segments in the segment stacked body.

2. The inspection cable guide mechanism according to claim 1, wherein the segment stacked body includes a first joint section, a second joint section and a third joint section,
each of the first joint section, the second joint section and the third joint section is constituted by the plurality of segments,
the first joint section, the second joint section and the third joint section are arranged in sequence of the first joint section, the second joint section and the third joint section in the centerline direction from a side opposite to the tip, and
the plurality of wires are constituted by
a plurality of first jointing wires with one ends fixed to the segment disposed on the most tip side of a side of the tip in the first joint section,
a plurality of second jointing wires with one ends fixed to the segment disposed on the most tip side in the second joint section, and
a plurality of third jointing wires with one ends fixed to the segment disposed on the most tip side in the third joint section.

3. A driving device configured to drive the inspection cable guide mechanism according to claim 1 by pulling the wire away from the tip and pushing the wire toward the tip, the driving device comprising:
a wire winding part on which the wire is wound;
a rotary actuator having a motor connected to the wire winding part and configured to rotate the wire winding part about an axis line in a winding direction of the wire;
a pulley having a pulley main body configured to convert a direction of the wire extending from the wire winding part toward the segment stacked body such that the wire extends along the centerline midway, and a support part configured to support the pulley main body; and a casing configured to accommodate and support the wire winding part, the rotary actuator and the pulley.

4. The driving device according to claim 3, wherein the rotary actuator further includes an encoder configured to detect a rotation angle of the motor, the pulley further includes a load cell provided on the support part; and the motor rotates the wire winding part based on the rotation angle detected by the encoder and the load applied to the support part measured by the load cell.

5. The driving device according to claim 3, wherein the wire winding part includes:

a spline connected to the motor from one side in an axis direction along the axis line;

a spool connected to the spline from the one side in the axis direction and having a spiral groove on which the wire is wound; and a nut into which the spool is threaded toward the one side in the axis direction and which is fixed to the casing, wherein a pitch of the spiral groove of the spool has the same dimension as that of the nut, and the spool is allowed to advance and retreat with respect to the nut in the axis direction together with the spline according to rotation of the motor while being threaded into the nut.

6. The driving device according to claim 3, wherein the rotary actuator further includes a linear guide configured to guide the motor in the axis direction, the wire winding part includes:

a spool connected to the motor from the one side in the axis direction and having a spiral groove in which the wire is wound; and a nut into which the spool is threaded toward the one side in the axis direction and which is fixed to the casing, a pitch of the spiral groove of the spool has the same dimension as that of the nut, and the spool is allowed to advance and retreat with respect to the nut in the axis direction together with the motor according to rotation of the motor while being threaded into the nut.

7. A driving device configured to drive an inspection cable guide mechanism configured to guide an inspection cable with a tip on which a sensor is provided by pulling a wire extending from the inspection cable guide mechanism away from the tip side of a side of the tip and pushing the wire toward the tip side, the driving device comprising:

a wire winding part on which the wire is wound;

a rotary actuator having a motor connected to the wire winding part and configured to rotate the wire winding part in a winding direction of the wire;

a pulley having a pulley main body configured to convert a direction of the wire extending from the wire winding part toward the inspection cable guide mechanism midway, and a support part configured to support the pulley main body; and a casing configured to accommodate and support the wire winding part, the rotary actuator and the pulley.

8. An inspection cable insertion jig connected to the inspection cable guide mechanism according to claim 1 from a side opposite to the tip and inserted into an inspection object together with the inspection cable guide mechanism, the inspection cable insertion jig comprising:

a plurality of split pipes having main body sections forming a cylindrical shape, covering the heat-resistant sheath and the wire from the outside and arranged at an interval in the centerline direction, and slide sections forming a cylindrical shape, surrounding the main body section from an outer circumferential side thereof and provided on the main body section to be slidable in the centerline direction;

a plurality of half split pipes forming a half-cylindrical shape and disposed between the neighboring main body sections to fill a space in which the neighboring main body sections are formed at the interval; and a screw configured to fix the slide section to the main body section of the split pipe adjacent to one split pipe of the plurality of split pipes in the centerline direction when the slide section of the one split pipe slides in the centerline direction and covers the half split pipe from the outside.

9. An inspection cable insertion jig connected to the inspection cable guide mechanism according to claim 1 from a side opposite to the tip and inserted into an inspection object together with the inspection cable guide mechanism, the inspection cable insertion jig comprising:

a cable accommodating body through which the heat-resistant sheath is allowed to be inserted, including a plurality of split bodies connected to each other along the centerline and bendable in only one direction; and a bending prevention member provided on the cable accommodating body along the centerline and configured to prevent bending of the cable accommodating body when fixed to the cable accommodating body.

10. An inspection cable insertion jig connected to an inspection cable guide mechanism configured to guide an inspection cable with a tip on which a sensor is provided from a side opposite to the tip and inserted into an inspection object together with the inspection cable guide mechanism, the inspection cable insertion jig comprising:

a plurality of split pipes having main body sections forming a cylindrical shape, covering the inspection cable from the outside and arranged at intervals in a direction in which a centerline of the inspection cable extends, and slide sections forming a cylindrical shape, surrounding the main body section from an outer circumferential side and provided on the main body sections to be slidable in the centerline direction;

a plurality of half split pipes forming a half-cylindrical shape and disposed between the neighboring main body sections to fill a space in which the neighboring main body sections are formed at the interval; and a screw configured to fix the slide section to the main body section of the split pipe adjacent to one split pipe of the plurality of split pipes in the centerline direction when the slide section of the one split pipe slides in the centerline direction and covers the half split pipe from the outside.

11. An inspection cable insertion jig connected to an inspection cable guide mechanism configured to guide an inspection cable with a tip on which a sensor is provided from a side opposite to the tip and inserted into an inspection object together with the inspection cable guide mechanism, the inspection cable insertion jig comprising:

a cable accommodating body through which the inspection cable is allowed to be inserted, including a plurality of split bodies connected to each other in a direction in which a centerline of the inspection cable extends and bendable in only one direction; and a bending prevention member provided on the cable accommodating body along the centerline and configured to prevent bending of the cable accommodating body when fixed to the cable accommodating body.

12. A gas turbine inspection system configured to inspect the inside of a gas turbine that is an inspection object, the gas turbine inspection system comprising:
the sensor and the inspection cable;
the inspection cable guide mechanism according to claim 1 inserted into the turbine following a combustor of the gas turbine through the combustor and configured to guide the inspection cable in the turbine;
the driving device disposed outside the gas turbine;
the inspection cable insertion jig;
an advancing/retreating actuator configured to advance and retreat the driving device toward or away from the combustor;
a cooling air supply part configured to supply the cooling air into the gap in the heat-resistant sheath from a side opposite to the tip; and
a control device configured to control rotation of the rotary actuator and advance/retreat of the driving device by the advancing/retreating actuator,
wherein the driving device is configured to drive the inspection cable guide mechanism by pulling the wire away from the tip and pushing the wire toward the tip,
the driving device comprises
a wire winding part on which the wire is wound;
a rotary actuator having a motor connected to the wire winding part and configured to rotate the wire winding part about an axis line in a winding direction of the wire;
a pulley having a pulley main body configured to convert a direction of the wire extending from the wire winding part toward the segment stacked body such that the wire extends along the centerline midway, and a support part configured to support the pulley main body; and
a casing configured to accommodate and support the wire winding part, the rotary actuator and the pulley,
the inspection cable insertion jig is connected to the inspection cable guide mechanism from a side opposite to the tip and inserted into an inspection object together with the inspection cable guide mechanism, and
the inspection cable insertion jig comprises
a plurality of split pipes having main body sections forming a cylindrical shape, covering the heat-resistant sheath and the wire from the outside and arranged at an interval in the centerline direction, and slide sections forming a cylindrical shape, surrounding the main body section from an outer circumferential side thereof and provided on the main body section to be slidable in the centerline direction;
a plurality of half split pipes forming a half-cylindrical shape and disposed between the neighboring main body sections to fill a space in which the neighboring main body sections are formed at the interval; and
a screw configured to fix the slide section to the main body section of the split pipe adjacent to one split pipe of the plurality of split pipes in the centerline direction when the slide section of the one split pipe slides in the centerline direction and covers the half split pipe from the outside.

* * * * *